US011296822B2

(12) United States Patent
Chen et al.

(10) Patent No.: US 11,296,822 B2
(45) Date of Patent: Apr. 5, 2022

(54) METHOD AND DEVICE FOR PROCESSING INTERFERENCE, STORAGE MEDIUM AND ELECTRONIC DEVICE

(71) Applicant: ZTE Corporation, Shenzhen (CN)

(72) Inventors: Mengzhu Chen, Shenzhen (CN); Hao Wu, Shenzhen (CN); Saijin Xie, Shenzhen (CN); Jun Xu, Shenzhen (CN); Yu Ngok Li, Shenzhen (CN); Yajun Zhao, Shenzhen (CN); Hanqing Xu, Shenzhen (CN)

(73) Assignee: ZTE CORPORATION, Shenzhen (CN)

( * ) Notice: Subject to any disclaimer, the term of this patent is extended or adjusted under 35 U.S.C. 154(b) by 0 days.

(21) Appl. No.: 17/214,529

(22) Filed: Mar. 26, 2021

(65) Prior Publication Data

US 2021/0288750 A1 Sep. 16, 2021

Related U.S. Application Data

(63) Continuation of application No. PCT/CN2019/108934, filed on Sep. 29, 2019.

(30) Foreign Application Priority Data

Sep. 28, 2018 (CN) ......................... 201811142483.3

(51) Int. Cl.

| | |
|---|---|
| ***H04L 5/00*** | (2006.01) |
| ***H04L 1/00*** | (2006.01) |
| ***H04L 27/26*** | (2006.01) |
| ***H04L 43/0823*** | (2022.01) |
| ***H04W 72/04*** | (2009.01) |
| ***H04W 72/08*** | (2009.01) |

(52) U.S. Cl.

CPC .......... *H04L 1/0048* (2013.01); *H04L 5/0005* (2013.01); *H04L 5/0048* (2013.01); *H04L 27/2657* (2013.01); *H04L 43/0847* (2013.01); *H04W 72/0453* (2013.01); *H04W 72/082* (2013.01)

(58) Field of Classification Search

CPC ... H04L 5/0048; H04L 27/261; H04L 1/0048; H04L 27/2657; H04L 43/0847; H04L 5/0005; H04W 72/0426; H04W 72/0453; H04W 72/082; H04W 88/08

See application file for complete search history.

(56) References Cited

FOREIGN PATENT DOCUMENTS

| | | | |
|---|---|---|---|
| CN | 106793107 | A | 5/2017 |
| CN | 108476188 | A | 8/2018 |
| CN | 108809587 | A | 11/2018 |

(Continued)

OTHER PUBLICATIONS

CMCC, "status report of SI on remote interference management for NR",3GPP TSG RAN meeting #81 RP-181831, Sep. 10-18, 2018, pp. 1-8 (Year: 2018).*

(Continued)

*Primary Examiner* — Rahel Guarino

(74) *Attorney, Agent, or Firm* — Crowell & Moring LLP

(57) ABSTRACT

Disclosed are a method and apparatus for processing interference, a storage medium and an electronic device. The method includes: generating a first reference signal, and sending the first reference signal according to a first parameter set.

9 Claims, 7 Drawing Sheets

Generate a first reference signal — S102

Send the first reference signal according to a first parameter set — S104

(56) References Cited

FOREIGN PATENT DOCUMENTS

WO WO2020032864 A1 * 2/2020 ............ H04W 24/02

OTHER PUBLICATIONS

International Search Report and English translation and Written Opinion regarding PCT/CN2019/108934 dated Dec. 27, 2019, 10 pages.

3GPP. "Third generation partnership project technical specification group radio access network study on remote interference management for NR (Release 16)" 3GPP TR 38.866 V1.0.0, Nov. 30, 2018 sections 6-7.

CMCC . "RP-181831: Status Report of SI on Remote Interference Management for NR," 36PP TSG RAN Meeting # 81, Sep. 13, 2018 entire document.

* cited by examiner

METHOD AND DEVICE FOR PROCESSING INTERFERENCE, STORAGE MEDIUM AND ELECTRONIC DEVICE

This application claims priority to Chinese Patent Application No. 201811142483.3 filed with the CNIPA on Sep. 28, 2018, the disclosure of which is incorporated herein by reference in its entirety.

TECHNICAL FIELD

The present disclosure relates to the field of communications and, specifically, to a method and apparatus for processing interference, a storage medium and an electronic device.

BACKGROUND

Under a certain meteorological condition, co-frequency interference in a time-division communication system may occur between base stations that are far apart (for example, tens of kilometers or even hundreds of kilometers). In this case, after a downlink signal of an interfering source base station reaches to an interfered base station with the same frequency through long-distance propagation, the downlink signal may be superimposed on other transmission slots of the interfered base station, thereby affecting the normal operation of an interfered base station system. This long-distance interference or remote interference may be superimposed effect of multi-base station interference. The long-distance interference is also called as atmospheric duct interference (ADI).

The 5th generation mobile communication system (5G) has requirements for high reliability and large throughput, but the above-mentioned remote interference still exists and needs to be solved urgently.

SUMMARY

Embodiments of the present disclosure provide a method and apparatus for processing interference, a storage medium and an electronic device to at least solve the problem of long-distance interference between base stations in the related art.

A method for processing interference provided according to an embodiment of the present application includes: generating a first reference signal, and sending the first reference signal according to a first parameter set. The first reference signal has at least one or any combination of the following characteristics: consisting of a cyclic prefix and N consecutive sequences; occupying P sub-carriers at an equal spacing within one physical resource block; being sent in an interleaved frequency division multiplexing mode; a sub-carrier spacing being $2\mu$ times a downlink data channel; a time domain pattern and/or a frequency domain pattern consisting of a time domain pattern of a second reference signal and/or a frequency domain pattern of a second reference signal; or a time domain pattern and/or a frequency domain pattern consisting of a pattern having a same time domain pattern as a second reference signal and/or a pattern having a same frequency domain pattern as a second reference signal, where N and P are positive integers, $-4\leq\mu\leq4$, and $\mu$ is an integer. The second reference signal includes at least one of: a channel state information reference signal (CSI-RS), a primary synchronization signal (PSS), a secondary synchronization signal (SSS) or a random access preamble.

An apparatus for processing interference provided according to another embodiment of the present application includes a generation module and a sending module. The generation module is configured to generate a first reference signal, and the sending module is configured to send the first reference signal according to a first parameter set. The first reference signal has at least one or any combination of the following characteristics: consisting of a cyclic prefix and N consecutive sequences; occupying P sub-carriers at an equal spacing within one physical resource block; being sent in an interleaved frequency division multiplexing mode; a sub-carrier spacing being $2\mu$ times a downlink data channel; a time domain pattern and/or a frequency domain pattern consisting of a time domain pattern of a second reference signal and/or a frequency domain pattern of a second reference signal; or a time domain pattern and/or a frequency domain pattern consisting of a pattern having a same time domain pattern as a second reference signal and/or a pattern having a same frequency domain pattern as a second reference signal, where N and P are positive integers, $-4\leq\mu\leq4$, and $\mu$ is an integer. The second reference signal includes at least one of: a CSI-RS, a PSS, an SSS or a random access preamble.

A storage medium is further provided according to another embodiment of the present application. The storage medium stores a computer program. The computer program is configured to, when executed, perform the steps of the method for processing interference in the preceding embodiment.

An electronic device is further provided according to another embodiment of the present application. The electronic device includes a memory and a processor. The memory stores a computer program and the processor is configured to execute the computer program to perform the steps of the method for processing interference in the preceding embodiment.

DETAILED DESCRIPTION

Hereinafter, the present application will be described in detail with reference to drawings and in conjunction with embodiments. It is to be noted that if not in collision, the embodiments and features therein in the present application may be combined with each other.

It is to be noted that the terms “first”, “second” and the like in the description, claims and drawings of the present application are used for distinguishing between similar objects and are not necessarily used for describing a particular order or sequence.

Embodiment One

Figure 1:
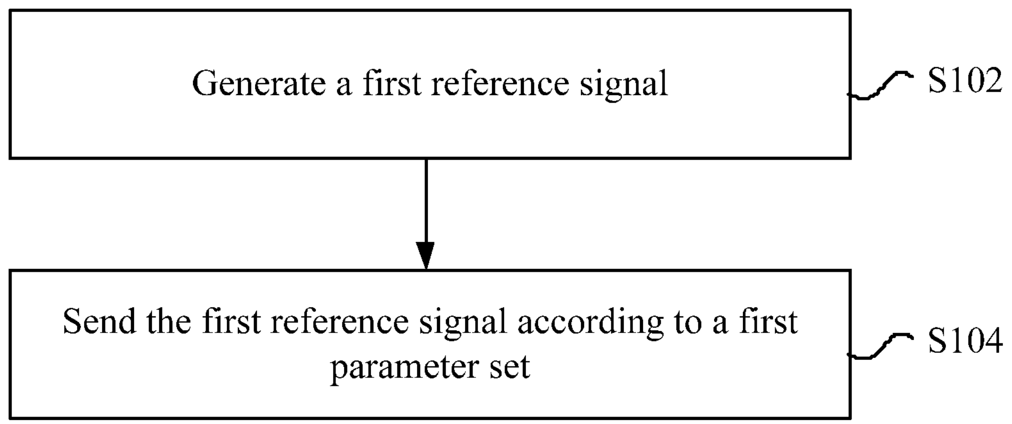
FIG. 1 is a flowchart of a method for processing interference according to an embodiment of the present application.

This embodiment provides a method for processing interference. FIG. 1 is a flowchart of a method for processing interference according to an embodiment of the present application. As shown in FIG. 1, the method includes the steps described below.

In step S102, a first reference signal is generated.

In step S104, the first reference signal is sent according to a first parameter set.

The first reference signal consists of a cyclic prefix and N consecutive sequences; the first reference signal occupies P sub-carriers at an equal spacing within one resource block; the first reference signal is sent in an IFDM mode; a sub-carrier spacing is 2μ times a downlink data channel; the sub-carrier spacing is 15 KHz or 30 KHz; a time domain pattern includes a time domain pattern of a second reference signal and a frequency domain pattern includes a frequency domain pattern of a second reference signal; a time domain pattern includes a pattern having a same time domain pattern as a second reference signal and a frequency domain pattern includes a pattern having a same frequency domain pattern as a second reference signal. N and P are each a positive integer, $-4 \leq \mu \leq 4$, and μ is an integer. The second reference signal includes at least one of: a CSI-RS, a PSS, an SSS or a random access preamble (a physical random access channel (PRACH) preamble).

Optionally, a value of P in the embodiment is 2, 3, 4 or 6. A value of N is {1, 2, 3, 4, 5}.

In the embodiment, the first reference signal is sent by an interfering base station or an interfering base station set or an interfering cell or an interfering cell set; or the first reference signal is sent by an interfered base station or an interfered base station set or an interfered cell or an interfered cell set.

In the embodiment, the first parameter set includes at least one of: a frequency domain resource, a frequency domain pattern, a time domain resource, a time domain pattern, time domain symbol information, a reference signal periodicity, a number of repetition times in a periodicity, a time offset set; a sub-carrier spacing or a power parameter.

It is to be noted that an operation flow of a remote interference management or a remote interference processing may be, but is not limited to frameworks one to four. Optionally, in the specific implementation process, part of steps in frameworks one to four may be omitted or skipped. Optionally, in the specific implementation process, an order of operations in the plurality of steps in frameworks one to four is not limited to an order described in the present application. Optionally, the specific implementation framework may be a fusion framework of frameworks one to four, for example, part of steps or part of operations of frameworks one to four are selected for the implementation.

Framework One

Figure 2:
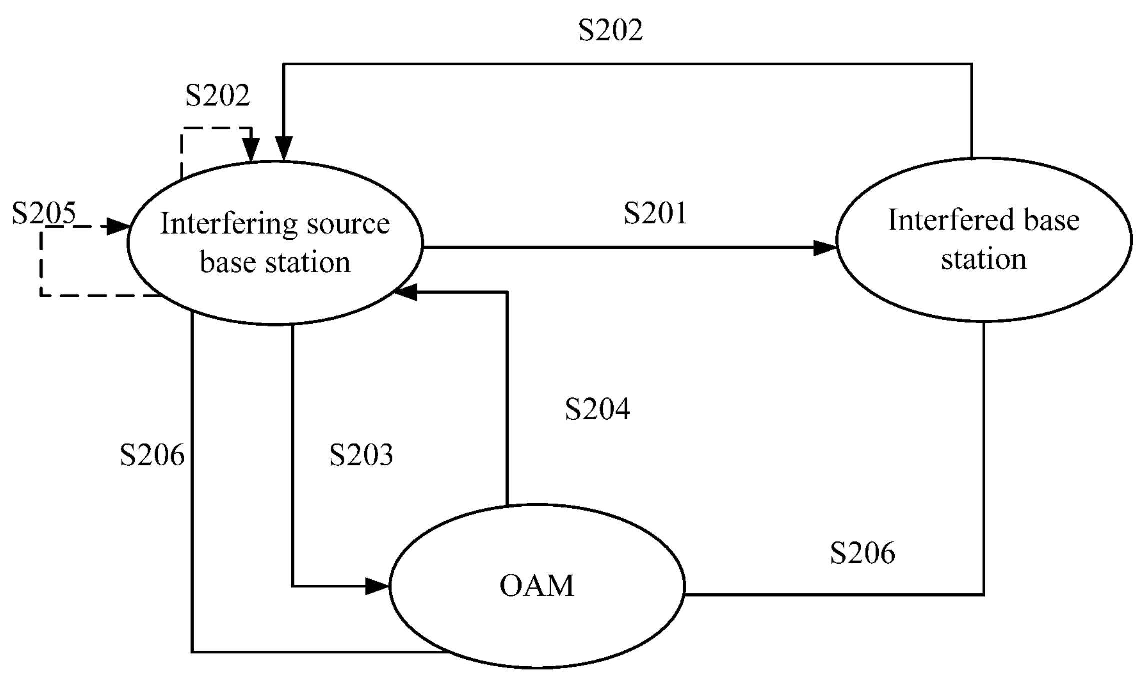
FIG. 2 is a schematic diagram of an operation flow of a remote interference management or a remote interference processing according to an embodiment of the present application.

FIG. 2 is a schematic diagram of an operation flow of a remote interference management or a remote interference processing according to an embodiment of the present application. As shown in FIG. 2, the operation flow includes the steps described below.

In step S201, an atmospheric ducting phenomenon occurs, and remote interference is generated.

In step S202, an interfered base station detects the remote interference, and sends a first reference signal; an interfering base station (also called as an interfering source base station) starts monitoring a reference signal under the intervention of an operation administration and maintenance (OAM).

In step S203, the interfering base station detects that the performance of the first reference signal satisfies a first specific requirement, and reports to the OAM.

In step S204, the OAM sends a remote interference management mechanism to the interfering base station.

In step S205, the interfering base station uses the remote interference management mechanism.

In step S206, under the intervention of the OAM, the interfering base station stops monitoring the first reference signal and restores configurations, and the interfered base station stops sending the first reference signal.

Framework Two

Figure 3:
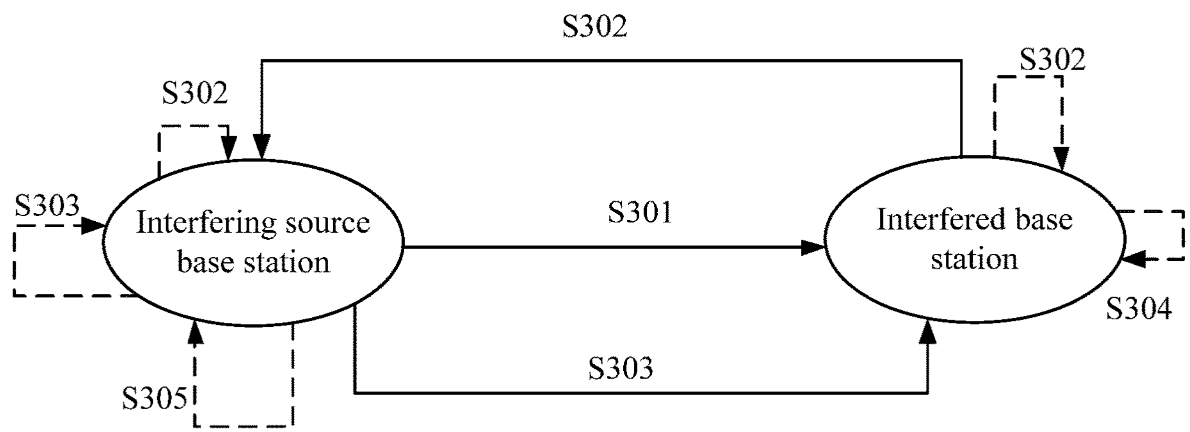
FIG. 3 is a schematic diagram of an operation flow of another remote interference management or another remote interference processing according to an embodiment of the present application.

FIG. 3 is a schematic diagram of an operation flow of another remote interference management or another remote interference processing according to an embodiment of the present application. As shown in FIG. 3, the operation flow includes the steps described below.

In step S301, an atmospheric ducting phenomenon occurs, and remote interference is generated.

In step S302, an interfered base station detects the remote interference, and sends a first reference signal RS-1; an interfering base station starts monitoring the first reference signal under the intervention of an OAM or in a case where the interfering base station detects the remote interference.

In step S303, the interfering base station detects that the performance of the first reference signal RS-1 satisfies a second specific requirement, uses a remote interference management mechanism and sends a first reference signal RS-2.

In step S304, if the interfered base station detects that the performance of the first reference signal RS-2 satisfies a third specific requirement, the interfered base station continues to send the first reference signal RS-1; if the interfered base station detects that the performance of the first reference signal RS-2 satisfies a fourth specific requirement, the interfered base station stops sending the first reference signal RS-1.

In step S305, the interfering base station continuous to use the remote interference management mechanism; if the interfering base station detects that the performance of the first reference signal RS-1 satisfies the fourth specific requirement, the interfering base station stops the remote interference management mechanism.

Framework Three

Figure 4:
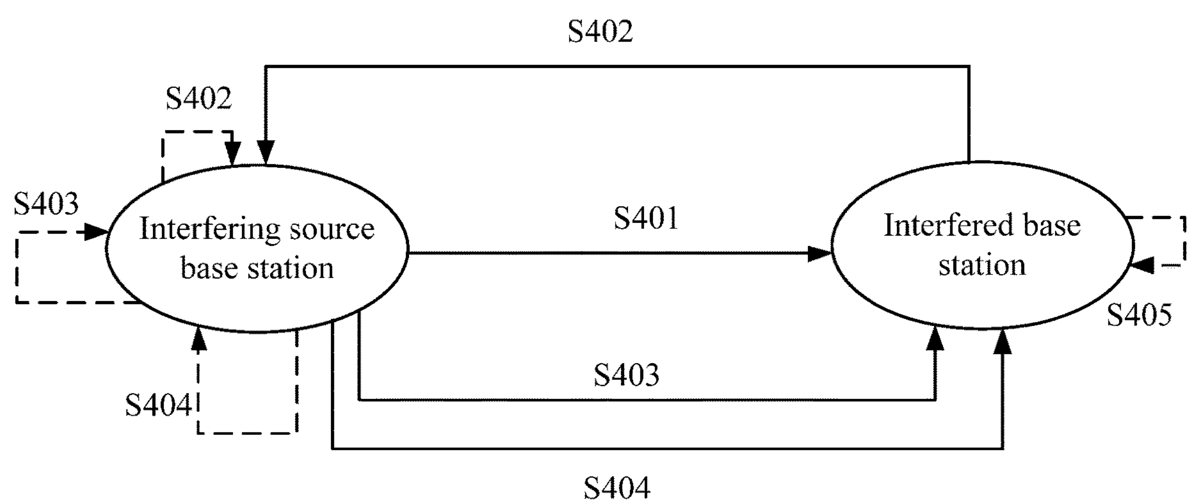
FIG. 4 is a schematic diagram of an operation flow of another remote interference management or another remote interference processing according to an embodiment of the present application.

FIG. 4 is a schematic diagram of an operation flow of another remote interference management or another remote interference processing according to an embodiment of the present application. As shown in FIG. 4, the operation flow includes the steps described below.

In step S401, an atmospheric ducting phenomenon occurs, and remote interference is generated.

In step S402, an interfered base station detects the remote interference, and sends a first reference signal; an interfering base station starts monitoring the first reference signal under the intervention of an OAM or in a case where the interfering base station detects the remote interference.

In step S403, the interfering base station detects that the performance of the first reference signal satisfies a fifth specific requirement, uses a remote interference management mechanism, and notifies the interfered base station that the first reference signal is received or the remote interference exists through backhaul signaling.

In step S404, if the interfering base station detects that the performance of the first reference signal satisfies a sixth specific requirement, the interfering base station notifies the interfered base station that the first reference signal is not received or the remote interference does not exist through the backhaul signaling.

In step S405, the interfered base station stops sending the first reference signal.

Framework Four

Figure 5:
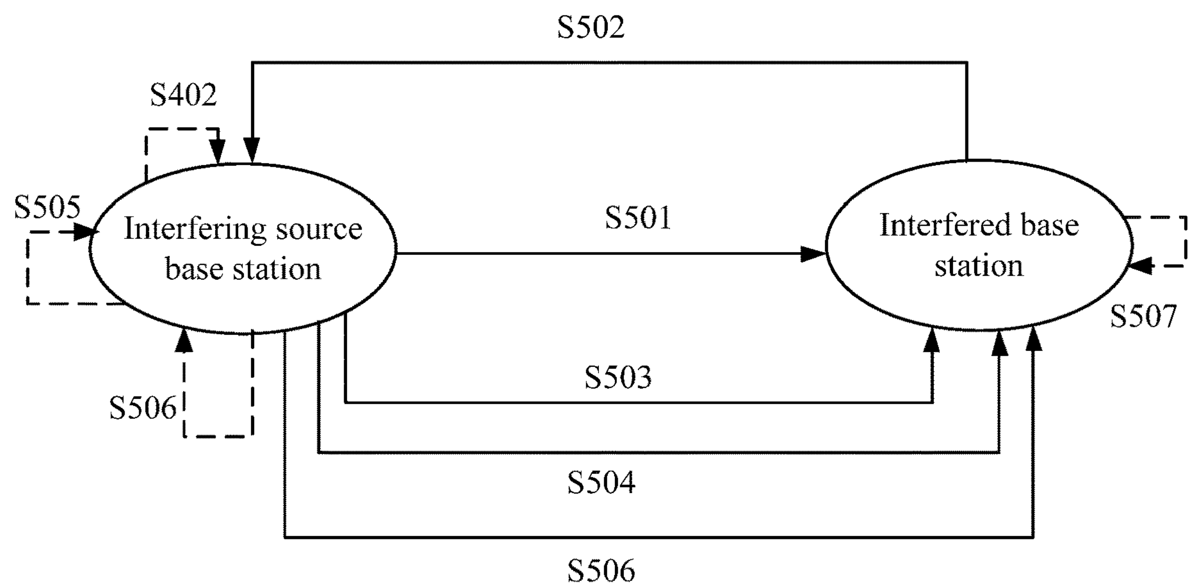
FIG. 5 is a schematic diagram of an operation flow of another remote interference management or another remote interference processing according to an embodiment of the present application.

FIG. 5 is a schematic diagram of an operation flow of another remote interference management or another remote interference processing according to an embodiment of the present application. As shown in FIG. 5, the operation flow includes the steps described below.

In step S501, an atmospheric ducting phenomenon occurs, and remote interference is generated.

In step S502, an interfered base station detects the remote interference, and sends a first reference signal; an interfering base station starts monitoring the first reference signal under the intervention of an OAM or in a case where the interfering base station detects the remote interference.

In step S503, the interfering base station detects that the performance of the first reference signal satisfies a fifth specific requirement, uses a remote interference management mechanism, and notifies the interfered base station that the first reference signal is received or the remote interference exists through backhaul signaling.

In step S504, after receiving the backhaul signaling in step S503, the interfered base station sends information to assist the interfering base station to use a suitable remote interference management mechanism.

In step S505, the interfering base station uses the remote interference management mechanism.

In step S506, if the interfering base station detects that the performance of the first reference signal satisfies a seventh specific requirement, the interfering base station notifies the interfered base station that the first reference signal is not received or the remote interference does not exist through the backhaul signaling.

It is to be noted that in optional implementations of the present application, the first specific requirement, the second specific requirement, the third specific requirement, the fourth specific requirement, the fifth specific requirement, the sixth specific requirement and the seventh specific requirement in frameworks one to four may be one of: a time domain characteristic of the first reference signal or a frequency domain characteristic of the first reference signal, the intensity of the detected first reference signal within a certain period of time, the number of times the first reference signal is detected within a certain period of time, or the like.

It is to be noted that in the remote interference processing or the remote interference management, the first reference signal may be sent by the interfered base station or cell, and if other base stations or cells detect that the performance of the first reference signal satisfies a specific requirement under a certain condition, other base stations or cells infer themselves to be the interfered base stations or cells; or the interfering base station or cell sends the first reference signal, and if the interfered base station or cell detects that the performance of the first reference signal satisfies a specific requirement under a certain condition, it is considered that the atmospheric ducting phenomenon still exists. Therefore, a design of the first reference signal is very important in the remote interference processing or the remote interference management.

It is to be noted that in the remote interference management, the first reference signal may be sent and/or detected by at least one of a single base station or a single cell; a base station set or a cell set (the set may also be called as a group or a cluster).

Optionally, when the first reference signal is sent and/or detected by the base station set or the cell set, the first reference signal may be sent and/or detected by one or part or all of base stations/cells in the base station set or the cell set. In other words, one base station/cell or part of the base stations/cells may be selected from the base station set or the cell set to send and/or detect the first reference signal, and the overhead can be reduced according to the method. Alternatively, all of the base stations/cells in the base station set or the cell set send and/or detect the first reference signal, and the detection performance of the first reference signal can be improved according to the method.

In the embodiment, the first reference signal RS-1 sent by the interfered base station and the first reference signal RS-2 sent by the interfering base station may be distinguished in at least one of the following manners: a time-frequency resource, an orthogonal sequence, or a sequence generation manner, where the sequence generation manner may include a sequence generator and/or an initialization value.

In the present application, the first reference signal is generated, and the first reference signal is sent according to the first parameter set, so that the problem of the remote interference between base stations can be solved, and a gap in the related art can be filled.

Optionally, in the embodiment, different base stations or different base station sets or different cells or different cell sets send the same first reference signal. In other words, the first reference signals sent by different base stations or different base station sets or different cells or different cell sets have the same time-frequency characteristic and the same generation sequence.

In the above embodiment, the first reference signals sent by different base stations or different base station sets or different cells or different cell sets are superimposed at a receiving end to enhance the detection performance.

Optionally, in the embodiment, the first reference signal may carry information of the base station or base station set or cell or cell set that sends the first reference signal, to distinguish the base station or base station set or cell or cell set that sends the first reference signal. In the present application, the information is referred to as a remote interference management identity. The remote interference management identity may identify the base station or base station set or cell or cell set that sends the first reference signal; or the base station or base station set or cell or cell set that sends the first reference signal may be distinguished by the remote interference management identity.

It is to be noted that in the present application, an identity for distinguishing the base station or base station set or cell or cell set that sends the first reference signal is referred to as the remote interference management identity, but the identity may also be named in other manners and is not limited to the remote interference management identity.

It is to be noted that the remote management identity may be used for assisting the base station in using a suitable remote management mechanism.

In the embodiment, part or all of information of the remote interference management identity may be represented by at least the characteristic of the first reference signal, and the characteristic includes at least one of a frequency domain characteristic, a time domain characteristic or a generation sequence. Specifically, a representation manner of part or all of information of the remote interference management identity may be represented in at least one of the manners described below.

Manner one: Part or all of information of the remote interference management identity may be jointly represented by first reference signals located in different symbols of a same slot. For example, the sent first reference signals occupy n orthogonal frequency division multiplexing (OFDM) symbols of slot i, a first reference signal on an n1-th OFDM symbol represents part or all of the remote interference management identity, and a first reference signal on an n2-th OFDM symbol represents part or all of the remote interference management identity. Optionally, a generation sequence of the first reference signal on the n1-th OFDM symbol is different from a generation sequence of the first reference signal on the n2-th OFDM symbol, where i, n, n1 and n2 are each a non-negative integer.

Manner two: Part or all of information of the remote interference management identity may be jointly represented by first reference signals located in different slots. For example, the first reference signals are sent in slot i1 and slot i2, a first reference signal in slot i1 represents part or all of the remote interference management identity, and a first reference signal in slot i2 represents part or all of the remote interference management identity. Optionally, a generation sequence of the first reference signal in slot i1 is different from a generation sequence of the first reference signal in slot i2, where i1 and i2 are each a non-negative integer.

Manner three: Part or all of information of the remote interference management identity may be represented by a frequency domain characteristic of the first reference signal. For example, part or all of information of the remote interference management identity may be presented by one of the following information of the first reference signal: a starting position, ending position, and center position of the frequency domain resources occupied by the first reference signal; a frequency domain bandwidth; or sub-band information (e.g., an index).

Figure 6:
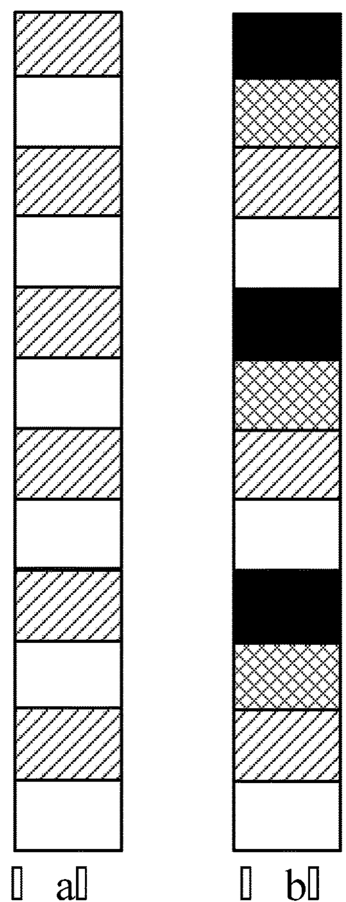
FIG. 6 is a schematic diagram of a frequency domain position offset of a first reference signal according to an embodiment of the present application.

Manner four: Part or all of information of the remote interference management identity may be represented by a frequency domain position offset of the first reference signal. For example, if the first reference signal has a frequency domain comb-like structure or the IFDM is used for the first reference signal or a frequency domain density is less than 12, part or all of the information of the remote interference management identity may be represented by the frequency domain offset position of the first reference signal. If the frequency domain density of the signal is d, the reference signal occupies d resource elements (REs) at an equal spacing within one physical resource block (PRB), and the number of the occupied physical resource blocks is determined by sequence length and/or resource allocation. FIG. 6 is a schematic diagram of a frequency domain position offset of a first reference signal according to an embodiment of the present application. As shown in FIG. 6, gray levels with different depths represent that the first reference signal has different frequency domain position offsets. In FIG. 6 (*a*), a value of the frequency domain position offset may be {0, 1} and may represent 1-bit information of the remote interference management identity. In FIG. 6 (*b*), a value of the frequency domain position offset may be {0, 1, 2, 3} and may represent 2-bit information of the remote interference management identity.

Manner five: Part or all of information of the remote interference management identity may be represented by the generation sequences of the first reference signal. For example, the number of sequences for generating the first reference signal is 2a, and the sequences may represent a-bit information of the remote interference management identity; or an initialization parameter of the generation sequence of the first reference signal is associated with part or all of information of the remote interference management identity, where a is a non-negative integer.

Manner six: Part or all of information of the remote interference management identity may be represented by a sub-carrier spacing of the first reference signal.

In the embodiment, the first reference signal is obtained by at least one of the following generation sequences: a pseudo-random noise (PN) sequence, a Zadoff-Chu (ZC) sequence or a specific sequence. Optionally, the PN sequence includes one of the following sequences: an m sequence or a Gold sequence.

Optionally, the initialization parameter of the generation sequence is associated with the remote interference management identity.

Optionally, the length of the remote interference management identity is 2, 3, 4, 10, 17, 20 or 22 bits.

Optionally, the generation sequence of the first reference signal is $$r(m)=\frac{1}{\sqrt{2}}(1-2\cdot c(2m))+j\frac{1}{\sqrt{2}}(1-2\cdot c(2m+1)).$$

Here, $$c(n)=(x_1(n+N_C)+x_2(n+N_C))mod2$$
$$x_1(n+31)=(x_1(n+3)+x_1(n))mod2$$
$$x_2(n+31)=(x_2(n+3)+x_2(n+2)+x_2(n+1)+x_2(n))mod2,$$

m is a non-negative integer, $N_c$=1600, an initialization value of a sequence $x_1$ is $x_1(0)=1$, $x_1(n)=0$, n=1, 2, . . . , 30. An initialization value of a sequence $x_2$ is associated with a remote interference management identity, or a value of a sequence $x_2$ may be selected from a set Initi_$x_2$. Optionally, the number of candidate values in the set Initi_$x_2$ may be 1, 2, 4 or 8.

The initialization value of the generation sequence of the first reference signal may be used for representing the remote interference management identity. However, in the remote interference management, a detection base station cannot obtain the initialization value of the generation sequence in advance. If the number of optional initialization values is large, the complexity of signal detection will be increased. Therefore, the number of candidate values in the set Initi_$x_2$ does not exceed 8.

Optionally, a generation sequence of the first reference signal is $r(m)=x_3((m+C) \bmod L)$, where m, a sequence index u, a cyclic shift value C and a sequence length L are each a non-negative integer, and $$x_3(i) = e^{-j\frac{\pi ui(i+1)}{L}},\ i = 0, 1, \ldots, L-1.$$

Optionally, the sequence index u and/or the cyclic shift value C is associated with to the remote interference management identity.

Optionally, if the first reference signal is sent by the base station set or the cell set, different base station sets or different cell sets use different sequence indexes u. Optionally, if the first reference signal is sent by the base station set or the cell set, different or part of base stations in the base station set use different cyclic shift values C; or different or part of cells in the cell set use different cyclic shift values C. Optionally, if the first reference signal is sent by the base station set or the cell set, different base station sets or different cell sets use different sequence indexes u, and different or part of base stations in the base station set use different cyclic shift values C; or different or part of cells in the cell set use different cyclic shift values C.

Optionally, the first reference signal occupies the last several (for example, N1, and N1 is a positive integer) downlink symbols of a slot where the first reference signal is located. Specifically, the slot where the first reference signal is located includes at least downlink symbols and flexible symbols, and symbols occupied by the first reference signal are the last several downlink symbols before the flexible symbols; or the slot where the first reference signal is located includes at least downlink symbols and guard period, and symbols occupied by the first reference signal are the last several downlink symbols before the guard period; or the slot where the first reference signal is located includes at least downlink symbols, guard period and flexible symbols, and symbols occupied by the first reference signal are the last several downlink symbols before the guard period or the flexible symbols; or the slot where the first reference signal is located includes downlink symbols, and symbols occupied by the first reference signal are the last several downlink symbols.

Optionally, the first reference signal occupies the last several (for example, N1, and N1 is a positive integer) downlink symbols of the slot where the first reference signal is located. Specifically, the slot where the first reference signal is located includes at least downlink symbols, flexible symbols and uplink symbols, and the symbols occupied by the first reference signal are the last several downlink symbols before the flexible symbols; or the slot where the first reference signal is located includes at least downlink symbols, guard period and uplink symbols, and the symbols occupied by the first reference signal are the last several downlink symbols before the guard period; or the slot where the first reference signal is located includes at least downlink symbols, guard period, flexible symbols and uplink symbols, and the symbols occupied by the first reference signal are the last several downlink symbols before the guard period or the flexible symbols; or the slot where the first reference signal is located includes downlink symbols and uplink symbols, and the symbols occupied by the first reference signal are the last several downlink symbols.

Optionally, the first reference signal occupies several (for example, N1, and N1 is a positive integer) symbols adjacent to and before a first position. Optionally, the downlink symbols of the slot where the first reference signal is located do not exceed the first position. Optionally, in a macro station where the base station or base station set or cell or cell set that sends the first reference signal is located, downlink symbols of special slots in all base stations or all cells do not exceed the first position.

Optionally, the special slot is a slot including downlink symbols, flexible symbols and uplink symbols; or the special slot is a slot including downlink symbols, guard period and uplink symbols; or the special slot is a slot including downlink symbols and flexible symbols; or the special slot is a slot including downlink symbols, flexible symbols and guard period.

Optionally, the first reference signal occupies the last several (for example, N1, and N1 is a positive integer) downlink symbols of the slot where the first reference signal is located; or optionally, the first reference signal occupies several (for example, N1, and N1 is a positive integer) symbols adjacent to and before the first position.

Optionally, a value of N1 may be selected from a set N1 set, that is, the value of N1 is configurable.

Optionally, the first reference signal satisfies one of the following characteristics: the first reference signal being sent in the interleaved frequency division multiplexing mode, a repetition factor being 2, and the sub-carrier spacing of the first reference signal being ½ or less of the downlink data channel; or the first reference signal being sent in the interleaved frequency division multiplexing mode, a repetition factor being 4, and the sub-carrier spacing of the first reference signal being ¼ or less of the downlink data channel; or a frequency domain density of the first reference signal being 6, and the sub-carrier spacing of the first reference signal being ½ or less of the downlink data channel; or a frequency domain density of the first reference signal being 3, and the sub-carrier spacing of the first reference signal being ¼ or less of the downlink data channel; or the first reference signal occupying 6 sub-carriers at an equal spacing within one resource block, and the sub-carrier spacing of the first reference signal being ½ or less of the downlink data channel; or the first reference signal occupying 3 sub-carriers at an equal spacing within one resource block, and the sub-carrier spacing of the first reference signal being ¼ or less of the downlink data channel; or the first reference signal occupying 3 sub-carriers at an equal spacing within one resource block, and the sub-carrier spacing of the first reference signal being ¼ or less of the downlink data channel; or the first reference signal being sent in the interleaved frequency division multiplexing mode, a repetition factor being 2, and the sub-carrier spacing of the first reference signal being 15 KHz; or the first reference signal being sent in the interleaved frequency division multiplexing mode, a repetition factor being 4, and the sub-carrier spacing of the first reference signal being 7.5 KHz; or a frequency domain density of the first reference signal being 6, and the sub-carrier spacing of the first reference signal being 15 KHz; or a frequency domain density of the first reference signal being 3, and the sub-carrier spacing of the first reference signal being 7.5 KHz; or the first reference signal occupying 6 sub-carriers at an equal spacing within one resource block, and the sub-carrier spacing of the first reference signal being 15 KHz; or the first reference signal occupying 3 sub-carriers at an equal spacing within one resource block, and the sub-carrier spacing of the first reference signal being 7.5 KHz; or the first reference signal consisting of a cyclic prefix and the N consecutive sequences, where the cyclic prefix is located before the N consecutive sequences or after the N consecutive sequences, and N is an positive integer.

Figure 7:
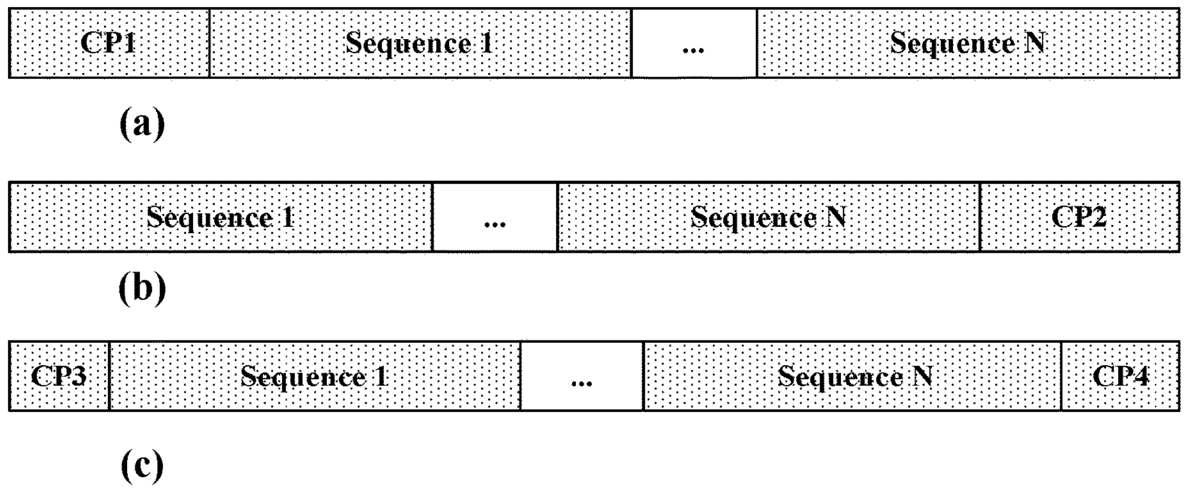
FIG. 7 is a schematic diagram of a slot for sending a first reference signal according to an embodiment of the present application.

Optionally, the first reference signal consists of the cyclic prefix and the N consecutive sequences, where the cyclic prefix is located before the N consecutive sequences; or the first reference signal consists of the cyclic prefix and the N consecutive sequences, where the cyclic prefix is located after the N consecutive sequences; or the first reference signal consists of cyclic prefixes and the N consecutive sequences, where the cyclic prefixes are located before and after the N consecutive sequences, and FIG. 7 is a schematic diagram of a slot for sending a first reference signal according to an embodiment of the present application, as shown in FIGS. 7 (*a*) to 7 (*c*).

Optionally, in a case where the first reference signal consists of the cyclic prefix and the N consecutive sequences, N sequences are obtained by repeating a same sequence, and N is a positive integer. Optionally, N is an element in a predefined set. Optionally, a value of N is 2.

Generally, the remote interference occurs for a long time, usually lasting several hours or more than ten hours. Therefore, in order to reduce the extra overhead brought to the communication system by sending the first reference signal, it is necessary to weigh the time-frequency resources occupied by the first reference signal and the performance of the first reference signal, so that the value of N is small, which is 2.

Optionally, a slot/subframe/radio frame/downlink-uplink-transition periodicity (DL-UL-transition periodicity) in which the base station or base station set or cell or cell set sends the first reference signal is associated with at least one of the following factors: a system frame number (SFN) or global positioning system (GPS) time.

Optionally, when the system frame number or the GPS time and the remote interference management identity satisfy a first condition, the base station or base station set or cell or cell set sends the first reference signal in part or all of the special slots in a current radio frame or DL-UL-transition periodicity.

Optionally, the first condition includes at least one of the following: (1) part or all of the bits in the system frame number being the same as part or all of the bits in the remote interference management identity; (2) (GPS sec*b) mod 2c being the same as part or all of the bits in the remote interference management identity, where b is a positive number and c is a non-negative number.

For example, when part or all of the bits in the system frame number are the same as part or all of the bits in the remote interference management identity, the first reference signal is sent in part or all of the special slots in the current radio frame. If the current radio frame has merely one special slot, the first reference signal is sent on the last several downlink symbols of the special slot/several symbols before the first position; if the number of the special slots in the current radio frame is greater than 1, the first reference signal is sent on the last several downlink symbols of one of the special slots/several symbols before the first position; if the number of the special slots in the current radio frame is greater than 1, the first reference signal is sent on the last several downlink symbols of part of the special slots/several symbols before the first position, where the first reference signal in each special slot may be the same or different.

For example, when part or all of the bits in the system frame number are the same as part or all of the bits in the remote interference management identity, the first reference signal is sent in part or all of the DL-UL-transition periodicities in the current radio frame. If the current radio frame includes one DL-UL-transition periodicity, the first reference signal is sent on the last several downlink symbols in the DL-UL-transition periodicity/several symbols before the first position; if the number of the DL-UL-transition periodicities in the current radio frame is greater than 1, the first reference signal is sent on the last several downlink symbols in one of the DL-UL-transition periodicities/several symbols before the first position; if the number of the DL-UL-transition periodicities in the current radio frame is greater than 1, the first reference signal is sent on the last several downlink symbols in part of the DL-UL-transition periodicities/several symbols before the first position, where the first reference signal in each DL-UL-transition periodicity may be the same or different.

Optionally, when (GPS sec*100*2u) mod 2c is the same as 2c-bit information of the remote interference management identity, the base station or base station set or cell or cell set sends the first reference signal in part or all of the special slots in the current radio frame or the DL-UL-transition periodicity. If the sub-carrier spacing of the first reference signal is 15*2d KHz, then u=2d, where d is a non-negative number; or u=0 or u is equal to another value independent of the sub-carrier spacing of the first reference signal.

Figure 8:
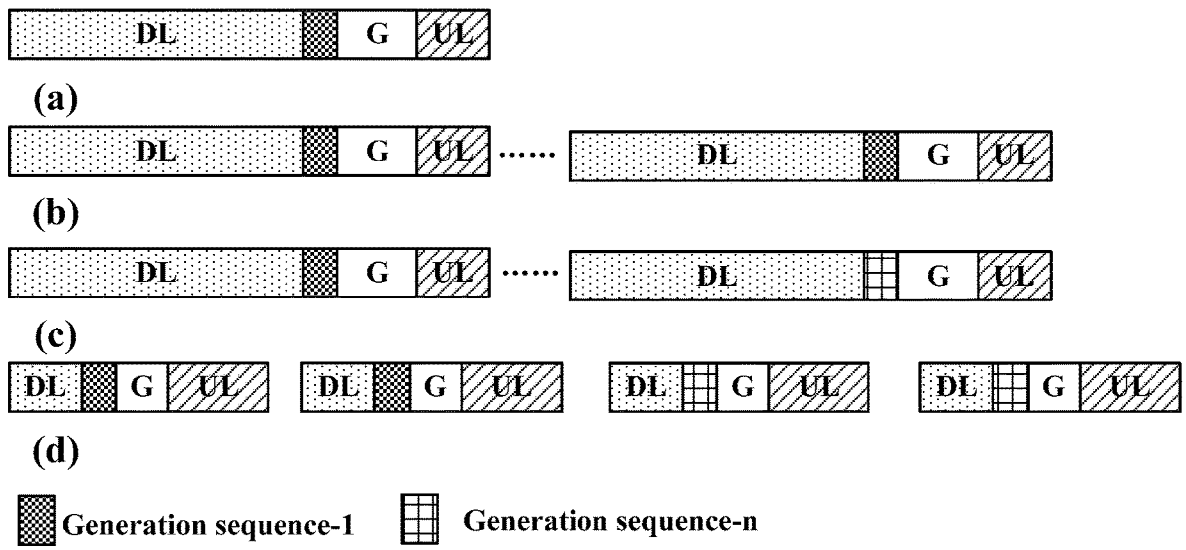
FIG. 8 is a structural diagram of a first reference signal according to an embodiment of the present application.

Optionally, FIG. 8 is a schematic diagram of a slot for sending a first reference signal according to an embodiment of the present application. If a periodicity (for example, 2c-u/100 seconds) of the first reference signal sent by the base station or base station set or cell or cell set is equal to the DL-UL-transition periodicity, the first reference signal is sent on the special slot in the DL-UL-transition periodicity, as shown in FIG. 8 (*a*).

Optionally, if a periodicity (for example, 2c-u/100 seconds) of the first reference signal sent by the base station or base station set or cell or cell set is greater than the DL-UL-transition periodicity, the first reference signals generated by the same sequence are sent on all of the special slots in the DL-UL-transition periodicity, as shown in FIG. 8 (*b*).

Optionally, if a periodicity (for example, 2c-u/100 seconds) of the first reference signal sent by the base station or base station set or cell or cell set is greater than the DL-UL-transition periodicity, the first reference signals generated by different sequences are sent on all or part of the special slots in the DL-UL-transition periodicity, as shown in FIGS. 8 (*c*) and 8 (*d*).

In FIG. 8, "DL" represents the downlink symbol, "UL" represents the uplink symbol, and "G" is the guard period or the flexible symbol.

Optionally, the first reference signal involved in the embodiment has at least one of the characteristics described blow.

A value of a transmission time periodicity T of the first reference signal is selected from a set T_set, where T and elements in the T_set are each a positive integer.

The transmission time periodicity of the first reference signal is not less than the DL-UL-transition periodicity. If the base station or base station set or cell or cell set that sends the first reference signal has a plurality of DL-UL-transition periodicities, the transmission time periodicity of the first reference signal is not less than the maximum periodicity among the plurality of DL-UL-transition periodicities; or if the base station or base station set or cell or cell set that sends the first reference signal has a plurality of DL-UL-transition periodicities, the transmission time periodicity of the first reference signal is not less than a sum of the plurality of DL-UL-transition periodicities.

A value of a transmission time offset of the first reference signal is selected from a set t_set, where t and elements in the t_set are each a positive integer.

The number of symbols occupied by the first reference signal in one periodicity is S, where $1 \le S \le 5$, and S is a positive integer.

A value of a frequency domain bandwidth F of the first reference signal is selected from a set F_set, where F and elements in the F_set are each a positive integer.

A value of a sub-carrier spacing u of the first reference signal is selected from a set u_set, where elements in the u_set include at least one of {15, 30, 60, 120} kHz.

It is to be noted that the transmission time periodicity, time offset, frequency domain bandwidth and sub-carrier spacing of the first reference signal are associated with at least one of a reference signal received power, a received signal strength indication or a reference signal received quality.

A time domain position of the first reference signal is associated with at least one of the following factors: the transmission periodicity T, a special slot position, a relationship between the transmission periodicity and the DL-UL-transition periodicity, the system frame number or the GPS time.

For the occupancy of the first reference signal sent by the base station, it needs to be considered that the impact on a user equipment (UE) and other reference signals.

Optionally, a symbol occupied by the first reference signal is indicated as a flexible symbol on which there is no dynamic or semi-static data scheduling; or a symbol occupied by the first reference signal is indicated as a flexible symbol, and no downlink control information indicates to receive or send data or a signal on the symbol occupied by the first reference signal; or a symbol occupied by the first reference signal is a flexible symbol, and no downlink control information indicates to receive a physical downlink shared channel (PDSCH) and a CSI-RS on the symbol occupied by the first reference signal, or indicates to send a physical uplink shared channel (PUSCH), a physical uplink control channel (PUCCH), a physical random access channel (PRACH), and a sounding reference signal (SRS) on the symbol occupied by the first reference signal; or a resource occupied by the first reference signal is the same as a zero power-channel state information-reference signal (ZP-CSI-RS); or a resource occupied by the first reference signal is a rate matching resource; or there is no dynamic or semi-static scheduling on a resource occupied by the first reference signal; or the UE does not expect to be dynamically or semi-statically scheduled on a resource for transmitting the first signal; or the UE does not expect to receive the PDSCH and the CSI-RS, or send the PUSCH, the PUCCH, the PRACH and the SRS on a resource for sending the first signal.

Optionally, a demodulation reference signal (DMRS) and the first reference signal are not transmitted on a same RE or a same PRB.

Optionally, a phase tracking reference signal (PTRS) and the first reference signal are not transmitted on a same RE or a same PRB.

Optionally, a CSI-RS and the first reference signal are not transmitted on a same RE or a same PRB.

Optionally, a synchronization signal/physical broadcast channel (SS/PBCH) and the first reference signal are not transmitted on a same RE or a same PRB.

Optionally, a control resource set (CORESET) does not overlap an RE or PRB occupied by the first reference signal.

Optionally, a system information block (SIB) and the first reference signal are not transmitted on a same RE or a same PRB.

The present application will be exemplarily described below in conjunction with implementations of the present application.

Implementation 1

In the embodiment of the present application, a generation sequence of a first reference signal is $$r(m) = \frac{1}{\sqrt{2}}(1 - 2 \cdot c(2m)) + j\frac{1}{\sqrt{2}}(1 - 2 \cdot c(2m + 1)),$$

or a predefined sequence r; where $$c(n) = (x_1(n + N_C) + x_2(n + N_C))mod2$$

$$x_1(n + 31) = (x_1(n + 3) + x_1(n))mod2$$

$$x_2(n + 31) = (x_2(n + 3) + x_2(n + 2) + x_2(n + 1) + x_2(n))mod2,$$

m is a non-negative integer, Nc=1600, an initialization value of a sequence x1 is $x_1(0)=1$, $x_1(n)=0$, n=1, 2, . . . , 30. Optionally, an initialization value of a sequence x2 is associated with a remote interference management identity, or a value of a sequence x2 may be selected from a set Initi_x2. Optionally, the number of candidate values in the set Initi_x2 may be 1, 2, 4 or 8; or a formula for calculating the initialization value of the sequence x2 is one of the following:

$$c_{ini}=(2^{10}N_{symb}^{slot}n_{s,f}+l+a1)(2n_{ID}+a1)+n_{ID})mod\ 2^{31}, \text{ or}$$

$$c_{ini}=(2^{10}(N_{symb}^{slot}n_{s,f}+a1)(2n_{ID}+a1)+n_{ID})mod\ 2^{31}, \text{ or}$$

$$c_{ini}=(2^{10}(N_{symb}^{slot}*+a3+a1)(2n_{ID}+a2)+n_{ID})mod\ 2^{31}.$$

Here, $N_{symb}^{slot}$ is a number of OFDM symbols in a slot, $n_{s,f}$ is a serial number of the slot occupied by the first reference signal in the radio frame, 1 is a serial number of the OFDM symbol occupied by the first reference signal in the slot, and a1, a2, and a3 are each a non-negative integer. Optionally, a1=a2=1.

Optionally, the maximum length of a predefined sequence is 511 or 1023.

In the embodiment, a frequency domain characteristic of the first reference signal includes at least one of: occupying P sub-carriers at an equal spacing within one resource block; being sent in the IFDM mode; a sub-carrier spacing being $2^{\mu}$ times a downlink data channel; a sub-carrier spacing being 15 KHz or 30 KHz; a time domain pattern and/or a frequency domain pattern consisting of a time domain pattern of a second reference signal and/or a frequency domain pattern of a second reference signal; or a time domain pattern and/or a frequency domain pattern consisting of a pattern having a same time domain pattern as a second reference signal and/or a pattern having a same frequency domain pattern as a second reference signal. P is a positive integer, $-4 \le \mu \le 4$, and μ is an integer. The second reference signal includes at least one of: a CSI-RS, a PSS, an SSS or a random access preamble (a PRACH preamble).

Optionally, a value of P is 2, 3, 4 or 6.

Figure 9:
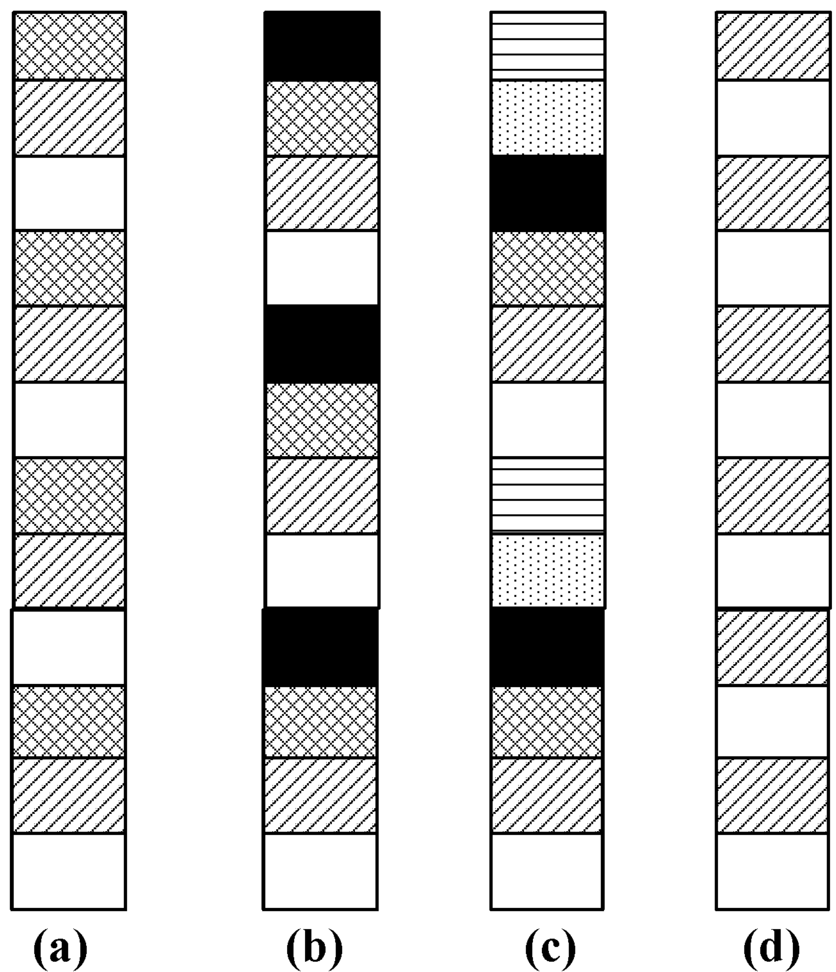
FIG. 9 is a schematic diagram of a characteristic of a frequency domain pattern of a first reference signal according to an embodiment of the present application.
Figure 10:
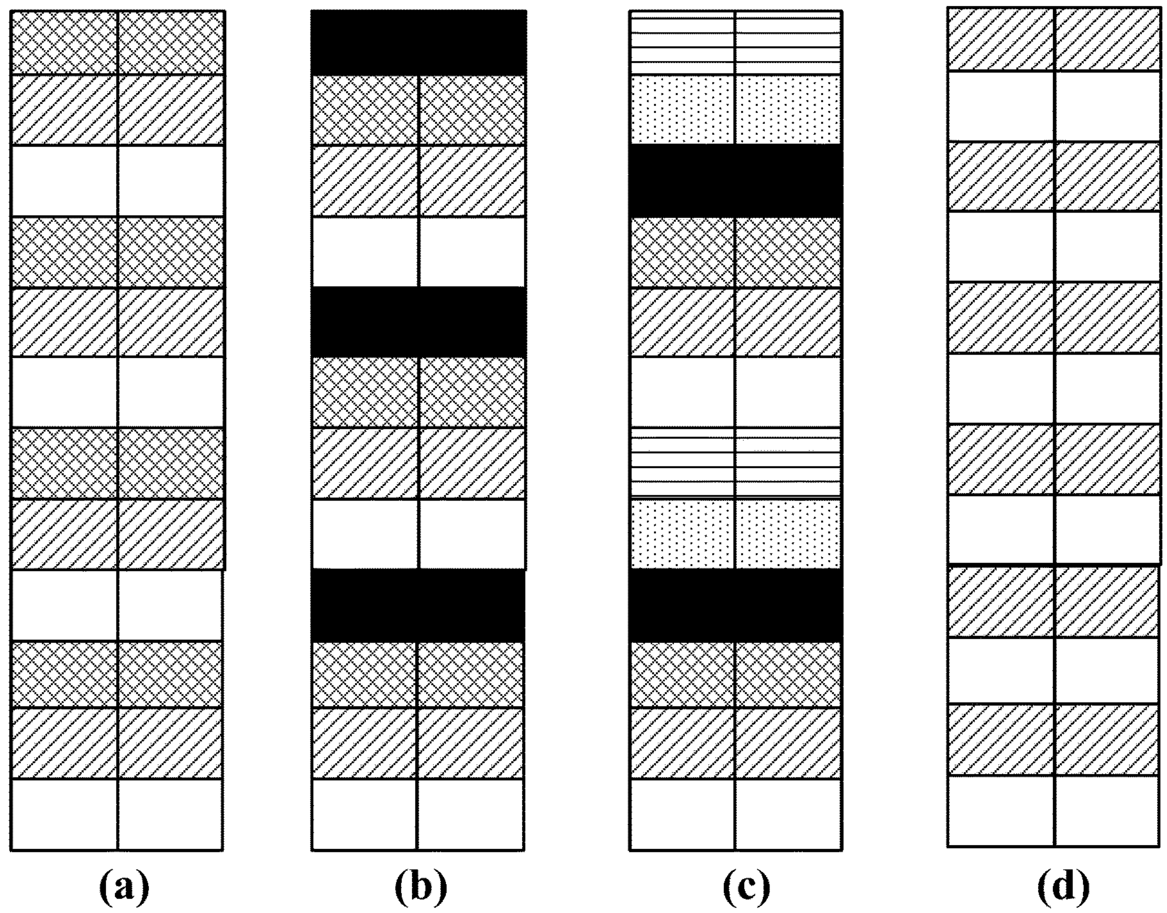
FIG. 10 is a schematic diagram of a characteristic of a time domain pattern of a first reference signal according to an embodiment of the present application.

Specifically, FIGS. 9 and 10 are each a schematic diagram of a characteristic of a frequency domain pattern of a first reference signal according to an embodiment of the present application. As shown in FIG. 9 or FIG. 10, a vertical axis represents frequency domain in which one PRB includes 12 sub-carriers, and a horizontal axis represents time domain. FIG. 9 differs from FIG. 10 in that the first reference signal in FIG. 9 occupies one OFDM symbol, and the first reference signal in FIG. 10 occupies two OFDM symbols. Optionally, the generation sequences in the two symbols are the same.

In FIG. 9 (*a*) or FIG. 10 (*a*), a frequency density of the first reference signal is 4 or a repetition factor is 3, and an index of a frequency domain sub-carrier occupied by the first reference signal is $k=nN_{sc}^{RB}+\bar{k}+k'$, where $N_{sc}^{RB}$ represents a number of sub-carriers in one PRB and a value of $N_{sc}^{RB}$ is 12, k' is a frequency domain offset value, and a value of k' is 0, 4 or 8, $0\le\bar{k}\le3$, n=0, 1, . . . nmax, and nmax is a non-negative integer.

In FIG. 9 (*b*) or FIG. 10 (*b*), the frequency density of the first reference signal is 3 or the repetition factor is 4, and the index of the frequency domain sub-carrier occupied by the first reference signal is $k=nN_{sc}^{RB}+\bar{k}+k'$, where $N_{sc}^{RB}$ represents a number of sub-carriers in one PRB and a value of $N_{sc}^{RB}$ is 12, a value of k is 0 or 3 or 6 or 9, $0\le\bar{k}\le2$, n=0, 1, . . . , nmax, and nmax is a non-negative integer.

In FIG. 9 (*c*) or FIG. 10 (*c*), the frequency density of the first reference signal is 2 or the repetition factor is 6, and the index of the frequency domain sub-carrier occupied by the first reference signal is $k=nN_{sc}^{RB}+\bar{k}+k'$, where $N_{sc}^{RB}$ represents a number of sub-carriers in one PRB and a value of $N_{sc}^{RB}$ is 12, a value of k is 0 or 2 or 4 or 6 or 8 or 10, $0\le\bar{k}\le1$, n=0, 1, . . . , nmax, and nmax is a non-negative integer.

In FIG. 9 (*d*) or FIG. 10 (*d*), the frequency density of the first reference signal is 6 or the repetition factor is 2, and the index of the frequency domain sub-carrier occupied by the first reference signal is $k=nN_{sc}^{RB}+\bar{k}+k'$, where $N_{sc}^{RB}$ represents the number of sub-carriers in one PRB and a value of $N_{sc}^{RB}$ is 12, a value of k is 0 or 1, $0\le\bar{k}\le5$, n=0, 1, . . . , nmax, and nmax is a non-negative integer.

Optionally, the first reference signal satisfies one of the following characteristics: the first reference signal being sent in the interleaved frequency division multiplexing mode, the repetition factor being 2, and the sub-carrier spacing of the first reference signal being ½ or less of the downlink data channel; or the first reference signal being sent in the interleaved frequency division multiplexing mode, the repetition factor being 4, and the sub-carrier spacing of the first reference signal being ¼ or less of the downlink data channel; or the frequency domain density of the first reference signal being 6, and the sub-carrier spacing of the first reference signal being ½ or less of the downlink data channel; or the frequency domain density of the first reference signal being 3, and the sub-carrier spacing of the first reference signal being ¼ or less of the downlink data channel; the first reference signal occupying 6 sub-carriers at an equal spacing within one resource block, and the sub-carrier spacing of the first reference signal being ½ or less of the downlink data channel; or the first reference signal occupying 3 sub-carriers at an equal spacing within one resource block, and the sub-carrier spacing of the first reference signal being ¼ or less of the downlink data channel; or the first reference signal occupying 3 sub-carriers at an equal spacing within one resource block, and the sub-carrier spacing of the first reference signal being ¼ or less of the downlink data channel; or the first reference signal being sent in the interleaved frequency division multiplexing mode, the repetition factor being 2, and the sub-carrier spacing of the first reference signal being 15 KHz; or the first reference signal being sent in the interleaved frequency division multiplexing mode, the repetition factor being 4, and the sub-carrier spacing of the first reference signal being 7.5 KHz; or the frequency domain density of the first reference signal being 6, and the sub-carrier spacing of the first reference signal being 15 KHz; or the frequency domain density of the first reference signal being 3, and the sub-carrier spacing of the first reference signal being 7.5 KHz; or the first reference signal occupying 6 sub-carriers at an equal spacing within one resource block, and the sub-carrier spacing of the first reference signal being 15 KHz; or the first reference signal occupying 3 sub-carriers at an equal spacing within one resource block, and the sub-carrier spacing of the first reference signal being 7.5 KHz.

Optionally, the time domain position of the first reference signal is associated with at least one of the following factors: a transmission periodicity T, a special slot position, a DL-UL-transition periodicity, a relationship between the transmission periodicity and the DL-UL-transition periodicity, a system frame number or GPS time.

Optionally, the first reference signal occupies the last several (for example, N1, and N1 is a positive integer) downlink symbols in a slot where the first reference signal is located. Specifically, the slot where the first reference signal is located includes at least downlink symbols and flexible symbols, and symbols occupied by the first reference signal are the last several downlink symbols before the flexible symbols; or the slot where the first reference signal is located includes at least downlink symbols and guard period, and symbols occupied by the first reference signal are the last several downlink symbols before the guard period; or the slot where the first reference signal is located includes at least downlink symbols, guard period and flexible symbols, and symbols occupied by the first reference signal are the last several downlink symbols before the guard period or the flexible symbols; or the slot where the first reference signal is located includes downlink symbols, and symbols occupied by the first reference signal are the last several downlink symbols.

Optionally, the first reference signal occupies the last several (for example, N1, and N1 is a positive integer) downlink symbols in the slot where the first reference signal is located. Specifically, the slot where the first reference signal is located includes at least downlink symbols, flexible symbols and uplink symbols, and the symbols occupied by the first reference signal are the last several downlink symbols before the flexible symbols; or the slot where the first reference signal is located includes at least downlink symbols, guard period and uplink symbols, and the symbols occupied by the first reference signal are the last several downlink symbols before the guard period; or the slot where the first reference signal is located includes at least downlink symbols, guard period, flexible symbols and uplink symbols, and the symbols occupied by the first reference signal are the last several downlink symbols before the guard period or the flexible symbols; or the slot where the first reference signal is located includes downlink symbols and uplink symbols, and the symbols occupied by the first reference signal are the last several downlink symbols.

Optionally, the first reference signal occupies several (for example, N1, and N1 is a positive integer) symbols adjacent to and before a first position. Optionally, the downlink symbols of the slot where the first reference signal is located do not exceed the first position. Optionally, in a macro station where the base station or base station set or cell or cell set that sends the first reference signal is located, downlink symbols of special slots in all base stations or all cells do not exceed the first position.

Optionally, the special slot is a slot including downlink symbols, flexible symbols and uplink symbols; or the special slot is a slot including downlink symbols, guard period and uplink symbols; or the special slot is a slot including downlink symbols and flexible symbols; or the special slot is a slot including downlink symbols, flexible symbols and guard period.

Optionally, the first reference signal occupies the last several (for example, N1, and N1 is a positive integer) downlink symbols of the slot where the first reference signal is located; or, optionally, the first reference signal occupies the several (for example, N1, and N1 is a positive integer) symbols adjacent to and before the first position.

Optionally, a value of N1 may be selected from a set N1 set, that is, the value of N1 is configurable. Optionally, the same generation sequence is used for the first reference signals on N1 symbols.

Optionally, a slot/subframe/radio frame/DL-UL-transition periodicity in which the base station or base station set or cell or cell set sends the first reference signal is associated with at least one of the following factors: an SNF or GPS time.

Optionally, when the system frame number or the GPS time and the remote interference management identity satisfy a first condition, the base station or base station set or cell or cell set sends the first reference signal in part or all of the special slots in a current radio frame or DL-UL-transition periodicity.

Optionally, the first condition includes at least one of the following: (1) part or all of the bits in the system frame number being the same as part or all of the bits in the remote interference management identity; (2) (GPS sec*b) mod 2c being the same as part or all of the bits in the remote interference management identity, where b is a positive number and c is a non-negative number.

For example, when part or all of the bits in the system frame number are the same as part or all of the bits in the remote interference management identity, the first reference signal is sent in part or all of the special slots in the current radio frame. If the current radio frame has merely one special slot, the first reference signal is sent on the last several downlink symbols of the special slot/several symbols before the first position; if the number of the special slots in the current radio frame is greater than 1, the first reference signal is sent on the last several downlink symbols of one of the special slots/several symbols before the first position; if the number of the special slots in the current radio frame is greater than 1, the first reference signal is sent on the last several downlink symbols of part of the of the special slots/several symbols before the first position, where the first reference signal in each special slot may be the same or different.

For example, when part or all of the bits in the system frame number are the same as part or all of the bits in the remote interference management identity, the first reference signal is sent in part or all of the DL-UL-transition periodicities in the current radio frame. If the current radio frame includes one DL-UL-transition periodicity, the first reference signal is sent on the last several downlink symbols in the DL-UL-transition periodicity/several symbols before the first position; if the number of the DL-UL-transition periodicities in the current radio frame is greater than 1, the first reference signal is sent on the last several downlink symbols in one of the DL-UL-transition periodicities/several symbols before the first position; if the number of the DL-UL-transition periodicities in the current radio frame is greater than 1, the first reference signal is sent on the last several downlink symbols in part of the DL-UL-transition periodicities/several symbols before the first position, where the first reference signal in each DL-UL-transition periodicity may be the same or different.

Optionally, when (GPS sec*100*2u) mod 2c is the same as 2c-bit information of the remote interference management identity, the base station or base station set or cell or cell set sends the first reference signal in part or all of the special slots in the current radio frame or the DL-UL-transition periodicity. If the sub-carrier spacing of the first reference signal is 15*2d KHz, then u=2d, where d is a non-negative number; or u=0 or u is equal to another value independent of the sub-carrier spacing of the first reference signal.

Optionally, if a periodicity (for example, 2c-u/100 seconds) of the first reference signal sent by the base station or base station set or cell or cell set is equal to the DL-UL-transition periodicity, the first reference signal is sent on the special slot in the DL-UL-transition periodicity.

Optionally, if a periodicity (for example, 2c-u/100 seconds) of the first reference signal sent by the base station or base station set or cell or cell set is greater than the DL-UL-transition periodicity, the first reference signals generated by the same sequence are sent on all of the special slots in the DL-UL-transition periodicity.

Optionally, if a periodicity (for example, 2c-u/100 seconds) of the first reference signal sent by the base station or base station set or cell or cell set is greater than the DL-UL-transition periodicity, the first reference signals generated by different sequences are sent on all or part of the special slots in the DL-UL-transition periodicity.

Optionally, the first reference signal involved in the embodiment has at least one of the characteristics described blow.

A value of a transmission time periodicity T of the first reference signal is selected from a set T_set, where T and elements in the T_set are each a positive integer.

The transmission time periodicity of the first reference signal is not less than the DL-UL-transition periodicity. If the base station or base station set or cell or cell set that sends the first reference signal has a plurality of DL-UL-transition periodicities, the transmission time periodicity of the first reference signal is not less than the maximum period among the plurality of DL-UL-transition periodicities; or if the base station or base station set or cell or cell set that sends the first reference signal has a plurality of DL-UL-transition periodicities, the transmission time periodicity of the first reference signal is not less than a sum of the plurality of DL-UL-transition periodicities.

A value of a transmission time offset of the first reference signal is selected from a set t_set, where t and elements in the t_set are each a positive integer.

The number of symbols occupied by the first reference signal in one transmission periodicity is S, where $1 \le S \le 5$, and S is a positive integer.

A value of a frequency domain bandwidth F of the first reference signal is selected from a set F_set, where F and elements in the F_set are each a positive integer.

A value of a sub-carrier spacing u of the first reference signal is selected from a set u_set, where elements in the u_set include at least one of {15, 30, 60, 120} kHz.

It is to be noted that the transmission time periodicity, time offset, frequency domain bandwidth and sub-carrier spacing of the first reference signal are associated with at least one of a reference signal received power, a received signal strength indication or a reference signal received quality.

In the embodiment, in the remote interference management, the first reference signal may be sent and/or detected by at least one of a single base station or a single cell; a base station set or a cell set (the set may also be called as a group or a cluster).

Optionally, when the first reference signal is sent and/or detected by the base station set or the cell set, the first reference signal may be sent and/or detected by one or part or all of base stations/cells in the base station set or the cell set. In other words, one or part of the base stations/cells may be selected from the base station set or the cell set to send and/or detect the first reference signal; or all of the base stations/cells in the base station set or the cell set send and/or detect the first reference signal.

Optionally, in the embodiment, the first reference signal sent by the interfered base station and the first reference signal sent by the interfering base station may be distinguished in at least one of the following manners: a time-frequency resource, an orthogonal sequence, or a sequence generation manner, where the sequence generation manner may include a sequence generator and/or an initialization value.

Optionally, in the embodiment, different base stations or different base station sets or different cells or different cell sets send the same first reference signal. In other words, the first reference signals sent by different base stations or different base station sets or different cells or different cell sets have the same time-frequency characteristic and the same generation sequence.

Optionally, in the embodiment, the first reference signal may carry information of the base station or base station set or cell or cell set that sends the first reference signal to distinguish the base station or base station set or cell or cell set that sends the first reference signal. In the present application, the information is referred to as a remote interference management identity. The remote interference management identity may identify the base station or base station set or cell or cell set that sends the first reference signal; or the base station or base station set or cell or cell set that sends the first reference signal may be distinguished by the remote interference management identity.

In the embodiment, part or all of the information of the remote interference management identity may be represented by at least the characteristic of the first reference signal, and the characteristic includes at least one of a frequency domain characteristic, a time domain characteristic or a generation sequence. Specifically, a representation manner of part or all of information of the remote interference management identity may be represented in at least one of the manners described below.

Manner one: Part or all of information of the remote interference management identity may be jointly represented by first reference signals located in different symbols of a same slot. For example, the sent first reference signals occupy n OFDM symbols of slot i, a first reference signal on an n1-th OFDM symbol represents part or all of the remote interference management identity, and a first reference signal on an n2-th OFDM symbol represents part or all of the remote interference management identity. Optionally, a generation sequence of the first reference signal on the n1-th OFDM symbol is different from a generation sequence of the first reference signal on the n2-th OFDM symbol, where i, n, n1 and n2 are each a non-negative integer.

Manner two: Part or all of information of the remote interference management identity may be jointly represented by first reference signals located in different slots. For example, the first reference signals are sent in slot i1 and slot i2, a first reference signal in slot i1 represents part or all of the remote interference management identity, and a first reference signal in slot i2 represents part or all of the remote interference management identity. Optionally, a generation sequence of the first reference signal in slot i1 is different from a generation sequence of the first reference signal in slot i2, where i1 and i2 are each a non-negative integer.

Manner three: Part or all of information of the remote interference management identity may be represented by a frequency domain characteristic of the first reference signal. For example, part or all of information of the remote interference management identity may be presented by one of the following information of the first reference signal: a starting position, ending position, and center position of the frequency domain resources occupied by the first reference signal; a frequency domain bandwidth; or sub-band information (e.g., an index).

Manner four: Part or all of information of the remote interference management identity may be represented by a frequency domain position offset of the first reference signal. For example, if the first reference signal has a frequency domain comb-like structure or the IFDM is used for the first reference signal or the frequency domain density is less than 12, part or all of the information of the remote interference management identity may be represented by the frequency domain offset position of the first reference signal. If the frequency domain density of the signal is d, the reference signal occupies d REs at an equal spacing within one PRB, and the number of the occupied physical resource blocks is determined by sequence length and/or resource allocation. In FIG. 6 (*a*), a value of the frequency domain position offset may be {0, 1} and may represent 1-bit information of the remote interference management identity. In FIG. 6 (*b*), a value of the frequency domain position offset may be {0, 1, 2, 3} and may represent 2-bit information of the remote interference management identity.

Manner five: Part or all of information of the remote interference management identity may be represented by the generation sequences of the first reference signal. For example, the number of sequences for generating the first reference signal is 2a, and the sequences may represent a-bit information of the remote interference management identity; or an initialization parameter of the generation sequence of the first reference signal is associated with part or all of information of the remote interference management identity, where a is a non-negative integer.

Manner six: Part or all of information of the remote interference management identity may be represented by a sub-carrier spacing of the first reference signal.

For the occupancy of the first reference signal sent by the base station, it needs to be considered that the impact on a UE and other reference signals.

Optionally, a symbol occupied by the first reference signal is indicated as a flexible symbol on which there is no dynamic or semi-static data scheduling; or a symbol occupied by the first reference signal is indicated as a flexible symbol, and no downlink control information indicates to receive or send data or a signal on the symbol occupied by the first reference signal; or a symbol occupied by the first reference signal is a flexible symbol, and no downlink control information indicates to receive a PDSCH and a CSI-RS on the symbol occupied by the first reference signal, or indicates to send a PUSCH, a PUCCH, a PRACH, and an SRS on the symbol occupied by the first reference signal; or a resource occupied by the first reference signal is the same as the ZP-CSI-RS; or a resource occupied by the first reference signal is a rate matching resource; or there is no dynamic or semi-static scheduling on a resource occupied by the first reference signal; or the UE does not expect to be dynamically or semi-statically scheduled on a resource for sending the first signal; or the UE does not expect to receive the PDSCH and the CSI-RS, or send the PUSCH, the PUCCH, the PRACH and the SRS on a resource for sending the first signal.

Optionally, a DMRS and the first reference signal are not transmitted on a same RE or a same PRB.

Optionally, a PTRS and the first reference signal are not transmitted on a same RE or a same PRB.

Optionally, a CSI-RS and the first reference signal are not transmitted on a same RE or a same PRB.

Optionally, an SS/PBCH and the first reference signal are not transmitted on a same RE or a same PRB.

Optionally, a CORESET does not overlap an RE or PRB occupied by the first reference signal.

Optionally, an SIB and the first reference signal are not transmitted on a same RE or a same PRB.

Implementation 2

In the embodiment of the present application, a generation sequence of a first reference signal is $r(m)=x_3((m+C) \bmod L)$, or a predefined sequence.

Here, m, a sequence index u, a cyclic shift value C and a sequence length L are each a non-negative integer, and $$x_3(i) = e^{-j\frac{\pi u i(i+1)}{L}},\ i = 0, 1, \ldots, L-1.$$

Optionally, the sequence index u and/or the cyclic shift value C is associated with a remote interference management identity.

Optionally, the maximum length of the predefined sequence is 511 or 1023.

In the embodiment, the first reference signal is sent by an interfering base station or an interfering base station set or an interfering cell or an interfering cell set; or the first reference signal is sent by an interfered base station or an interfered base station set or an interfered cell or an interfered cell set.

Optionally, if the first reference signal is sent by the base station set or the cell set, different base station sets or different cell sets use different sequence indexes u. Optionally, if the first reference signal is sent by the base station set or the cell set, different or part of base stations in the base station set use different cyclic shift values C; or different or part of cells in the cell set use different cyclic shift values C. Optionally, if the first reference signal is sent by the base station set or the cell set, different base station sets or different cell sets use different sequence indexes u, and different or part of base stations in the base station set use different cyclic shift values C; or different or part of cells in the cell set use different cyclic shift values C.

In the embodiment, the first reference signal has one of the following characteristics: consisting of a cyclic prefix and N consecutive sequences; a sub-carrier spacing being $2^{\mu}$ times a downlink data channel; the sub-carrier spacing being 15 KHz or 30 KHz; a time domain pattern consisting of a time domain pattern of a second reference signal and a frequency domain pattern consisting of a frequency domain pattern of the second reference signal; or a time domain pattern consisting of a pattern having a same time domain pattern as a second reference signal and a frequency domain pattern consisting of a pattern having a same frequency domain pattern as the second reference signal. N is a positive integer, $-4 \leq \mu \leq 4$, and $\mu$ is an integer. The second reference signal includes at least one of: a CSI-RS, a PSS, an SSS or a random access preamble (a PRACH preamble).

Optionally, the first reference signal consists of the cyclic prefix and the N consecutive sequences, where the cyclic prefix is located before the N consecutive sequences; or the first reference signal consists of the cyclic prefix and the N consecutive sequences, where the cyclic prefix is located after the N consecutive sequences; or the first reference signal consists of the cyclic prefixes and the N consecutive sequences, where the cyclic prefixes are located before and after the N consecutive sequences, as shown in FIGS. 7 (*a*) to 7 (*c*).

Optionally, a value of N is {1, 2, 3, 4, 5}.

Optionally, a time domain position of the first reference signal is associated with at least one of the following factors: a transmission periodicity T, a special slot position, a DL-UL-transition periodicity, a relationship between the transmission periodicity and the DL-UL-transition periodicity, a system frame number or GPS time.

Optionally, the first reference signal occupies the last several (for example, N1, and N1 is a positive integer) downlink symbols of a slot where the first reference signal is located. Specifically, the slot where the first reference signal is located includes at least downlink symbols and flexible symbols, and symbols occupied by the first reference signal are the last several downlink symbols before the flexible symbols; or the slot where the first reference signal is located includes at least downlink symbols and guard period, and symbols occupied by the first reference signal are the last several downlink symbols before the guard period; or the slot where the first reference signal is located includes at least downlink symbols, guard period and flexible symbols, and symbols occupied by the first reference signal are the last several downlink symbols before the guard period or the flexible symbols; or the slot where the first reference signal is located includes downlink symbols, and symbols occupied by the first reference signal are the last several downlink symbols.

Optionally, the first reference signal occupies the last several (for example, N1, and N1 is a positive integer) downlink symbols of the slot where the first reference signal is located. Specifically, the slot where the first reference signal is located includes at least downlink symbols, flexible symbols and uplink symbols, and the symbols occupied by the first reference signal are the last several downlink symbols before the flexible symbols; or the slot where the first reference signal is located includes at least downlink symbols, guard period and uplink symbols, and the symbols occupied by the first reference signal are the last several downlink symbols before the guard period; or the slot where the first reference signal is located includes at least downlink symbols, guard period, flexible symbols and uplink symbols, and the symbols occupied by the first reference signal are the last several downlink symbols before the guard period or the flexible symbols; or the slot where the first reference signal is located includes downlink symbols and uplink symbols, and the symbols occupied by the first reference signal are the last several downlink symbols.

Optionally, the first reference signal occupies several (for example, N1, and N1 is a positive integer) symbols adjacent to and before a first position. Optionally, the downlink symbols of the slot where the first reference signal is located do not exceed the first position. Optionally, in a macro station where the base station or base station set or cell or cell set that sends the first reference signal is located, downlink symbols of special slots in all base stations or all cells do not exceed the first position.

Optionally, the special slot is a slot including downlink symbols, flexible symbols and uplink symbols; or the special slot is a slot including downlink symbols, guard period and uplink symbols; or the special slot is a slot including downlink symbols and flexible symbols; or the special slot is a slot including downlink symbols, flexible symbols and guard period.

Optionally, the first reference signal occupies the last several (for example, N1, and N1 is a positive integer) downlink symbols of the slot where the first reference signal is located; or, optionally, the first reference signal occupies several (for example, N1, and N1 is a positive integer) symbols adjacent to and before the first position.

Optionally, a value of N1 may be selected from a set N1 set, that is, the value of N1 is configurable. Optionally, the same generation sequence is used for the first reference signals on N1 symbols.

Optionally, a slot/subframe/radio frame/DL-UL-transition periodicity in which the base station or base station set or cell or cell set sends the first reference signal is associated with at least one of the following factors: an SNF or GPS time.

Optionally, when the system frame number or the GPS time and the remote interference management identity satisfy a first condition, the base station or base station set or cell or cell set sends the first reference signal in part or all of the special slots in a current radio frame or DL-UL-transition periodicity.

Optionally, the first condition includes at least one of the following: (1) part or all of the bits in the system frame number being the same as part or all of the bits in the remote interference management identity; (2) (GPS sec*b) mod 2c being the same as part or all of the bits in the remote interference management identity, where b is a positive number and c is a non-negative number.

For example, when part or all of the bits in the system frame number are the same as part or all of the bits in the remote interference management identity, the first reference signal is sent in part or all of the special slots in the current radio frame. If the current radio frame has merely one special slot, the first reference signal is sent on the last several downlink symbols of the special slot/several symbols before the first position; if the number of the special slots in the current radio frame is greater than 1, the first reference signal is sent on the last several downlink symbols of one of the special slots/several symbols before the first position; if the number of the special slots in the current radio frame is greater than 1, the first reference signal is sent on the last several downlink symbols of part of the special slots/several symbols before the first position, where the first reference signal in each special slot may be the same or different.

For example, when part or all of the bits in the system frame number are the same as part or all of the bits in the remote interference management identity, the first reference signal is sent in part or all of the DL-UL-transition periodicities in the current radio frame. If the current radio frame includes one DL-UL-transition periodicity, the first reference signal is sent on the last several downlink symbols in the DL-UL-transition periodicity/several symbols before the first position; if the number of the DL-UL-transition periodicities in the current radio frame is greater than 1, the first reference signal is sent on the last several downlink symbols in one of the DL-UL-transition periodicities/several symbols before the first position; if the number of the DL-UL-transition periodicities in the current radio frame is greater than 1, the first reference signal is sent on the last several downlink symbols in part of the DL-UL-transition periodicities/several symbols before the first position, where the first reference signal in each DL-UL-transition periodicity may be the same or different.

Optionally, when (GPS sec*100*2u) mod 2c is the same as 2c-bit information of the remote interference management identity, the base station or base station set or cell or cell set sends the first reference signal in part or all of the special slots in the current radio frame or the DL-UL-transition periodicity. If the sub-carrier spacing of the first reference signal is 15*2d KHz, then u=2d, where d is a non-negative number; or u=0 or u is equal to another value independent of the sub-carrier spacing of the first reference signal.

Optionally, if a periodicity (for example, 2c-u/100 seconds) of the first reference signal sent by the base station or base station set or cell or cell set is equal to the DL-UL-transition periodicity, the first reference signal is sent on the special slot in the DL-UL-transition periodicity.

Optionally, if a periodicity (for example, 2c-u/100 seconds) of the first reference signal sent by the base station or base station set or cell or cell set is greater than the DL-UL-transition periodicity, the first reference signals generated by the same sequence are sent on all of the special slots in the DL-UL-transition periodicity.

Optionally, if a periodicity (for example, 2c-u/100 seconds) of the first reference signal sent by the base station or base station set or cell or cell set is greater than the DL-UL-transition periodicity, the first reference signals generated by different sequences are sent on all or part of the special slots in the DL-UL-transition periodicity.

Optionally, the first reference signal involved in the embodiment has at least one of the characteristics described blow.

A value of a transmission time periodicity T of the first reference signal is selected from a set T_set, where T and elements in the T_set are each a positive integer.

The transmission time periodicity of the first reference signal is not less than the DL-UL-transition periodicity. If the base station or base station set or cell or cell set that sends the first reference signal has a plurality of DL-UL-transition periodicities, the transmission time periodicity of the first reference signal is not less than the maximum periodicity among the plurality of DL-UL-transition periodicities; or if the base station or base station set or cell or cell set that sends the first reference signal has a plurality of DL-UL-transition periodicities, the transmission time periodicity of the first reference signal is not less than a sum of the plurality of DL-UL-transition periodicities.

A value of a transmission time offset of the first reference signal is selected from a set t_set, where t and elements in the t_set are each a positive integer.

The number of symbols occupied by the first reference signal in one transmission periodicity is S, where $1 \leq S \leq 5$, and S is a positive integer.

A value of a frequency domain bandwidth F of the first reference signal is selected from a set F_set, where F and elements in the F_set are each a positive integer.

A value of a sub-carrier spacing u of the first reference signal is selected from a set u_set, where elements in the u_set include at least one of {15, 30, 60, 120} kHz.

It is to be noted that the transmission time periodicity, time offset, frequency domain bandwidth and sub-carrier spacing of the first reference signal are associated with at least one of a reference signal received power, a received signal strength indication or a reference signal received quality.

In the embodiment, in the remote interference management, the first reference signal may be sent and/or detected by at least one of a single base station or a single cell; or a base station set or a cell set (the set may also be called as a group or a cluster).

Optionally, when the first reference signal is sent and/or detected by the base station set or the cell set, the first reference signal may be sent and/or detected by one or part or all of base stations/cells in the base station set or the cell set. In other words, one or part of the base stations/cells may be selected from the base station set or the cell set to send and/or detect the first reference signal; or all of the base stations/cells in the base station set or the cell set send and/or detect the first reference signal.

Optionally, in the embodiment, the first reference signal sent by the interfered base station and the first reference signal sent by the interfering base station may be distinguished in at least one of the following manners: a time-frequency resource, an orthogonal sequence, or a sequence generation method, where the sequence generation manner may include a sequence generator and/or an initialization value.

Optionally, in the embodiment, different base stations or different base station sets or different cells or different cell sets send the same first reference signal. In other words, the first reference signals sent by different base stations or different base station sets or different cells or different cell sets have the same time-frequency characteristic and the same generation sequence.

Optionally, in the embodiment, the first reference signal may carry information of the base station or base station set or cell or cell set that sends the first reference signal to distinguish the base station or base station set or cell or cell set that sends the first reference signal. In the present application, the information is referred to as the remote interference management identity. The remote interference management identity may represent the base station or base station set or cell or cell set that sends the first reference signal; or the base station or base station set or cell or cell set that sends the first reference signal may be distinguished by the remote interference management identity.

In the embodiment, part or all of the information of the remote interference management identity may be represented by at least the characteristic of the first reference signal, and the characteristic includes at least one of a frequency domain characteristic, a time domain characteristic or a generation sequence. Specifically, a representation manner of part or all of information of the remote interference management identity may be represented in at least one of the manners described below.

Manner one: Part or all of information of the remote interference management identity is jointly represented by first reference signals located in different symbols of a same slot. For example, the sent first reference signals occupy n OFDM symbols of slot i, where a first reference signal on an n1-th OFDM symbol represents part or all of the remote interference management identity, and a first reference signal on an n2-th OFDM symbol represents part or all of the remote interference management identity. Optionally, a generation sequence of the first reference signal on the n1-th OFDM symbol is different from a generation sequence of the first reference signal on the n2-th OFDM symbol, where i, n, n1 and n2 are each a non-negative integer.

Manner two: Part or all of information of the remote interference management identity is jointly represented by first reference signals located in different slots. For example, the first reference signals are sent in slot i1 and slot i2, a first reference signal in slot i1 represents part or all of the remote interference management identity, and a first reference signal in slot i2 represents part or all of the remote interference management identity. Optionally, a generation sequence of the first reference signal in slot i1 is different from a generation sequence of the first reference signal in slot i2, where i1 and i2 are each a non-negative integer.

Manner three: Part or all of information of the remote interference management identity may be represented by a frequency domain characteristic of the first reference signal. For example, part or all of information of the remote interference management identity may be presented by one of the following pieces of information of the first reference signal: a starting position, ending position, and center position of the frequency domain resources occupied by the first reference signal; a frequency domain bandwidth; or sub-band information (e.g., an index).

Manner four: Part or all of information of the remote interference management identity is represented by a frequency domain position offset of the first reference signal. For example, if the first reference signal has a frequency domain comb-like structure or the IFDM is used for the first reference signal or a frequency domain density is less than 12, part or all of the information of the remote interference management identity may be represented by the frequency domain offset position of the first reference signal. If the frequency domain density of the signal is d, the reference signal occupies d REs at an equal spacing within a PRB, and the number of the occupied physical resource blocks is determined by sequence length and/or resource allocation. In FIG. 6 (*a*), a value of the frequency domain position offset may be {0, 1} and may represent 1-bit information of the remote interference management identity. In FIG. 6 (*b*), a value of the frequency domain position offset may be {0, 1, 2, 3} and may represent 2-bit information of the remote interference management identity.

Manner five: Part or all of information of the remote interference management identity may be represented by the generation sequences of the first reference signal. For example, the number of sequences for generating first reference signal is 2a, and the sequences may represent a-bit information of the remote interference management identity; or an initialization parameter of the generation sequence of the first reference signal is associated with part or all of information of the remote interference management identity, where a is a non-negative integer.

Manner six: Part or all of information of the remote interference management identity may be represented by a sub-carrier spacing of the first reference signal.

For the occupancy of the first reference signal sent by the base station, it needs to be considered the impact on a UE and other reference signals.

Optionally, a symbol occupied by the first reference signal is indicated as a flexible symbol on which there is no dynamic or semi-static data scheduling; or a symbol occupied by the first reference signal is indicated as a flexible symbol, and no downlink control information indicates to receive or send data or a signal on the symbol occupied by the first reference signal; or a symbol occupied by the first reference signal is a flexible symbol, and no downlink control information indicates to receive a PDSCH and a CSI-RS on the symbol occupied by the first reference signal, or indicates to send a PUSCH, a PUCCH, a PRACH, and an SRS on the symbol occupied by the first reference signal; or a resource occupied by the first reference signal is the same as the ZP-CSI-RS; or a resource occupied by the first reference signal is a rate matching resource; or there is no dynamic or semi-static scheduling on a resource occupied by the first reference signal; or the UE does not desire to be dynamically or semi-statically scheduled on a resource for sending the first signal; or the UE does not desire to receive the PDSCH and the CSI-RS, or send the PUSCH, the PUCCH, the PRACH and the SRS on a resource for sending the first signal.

Optionally, a DMRS and the first reference signal are not transmitted on a same RE or a same PRB.

Optionally, a PTRS and the first reference signal are not transmitted on a same RE or a same PRB.

Optionally, a CSI-RS and the first reference signal are not transmitted on a same RE or a same PRB.

Optionally, an SS/PBCH and the first reference signal are not transmitted on a same RE or a same PRB.

Optionally, a CORESET does not overlap an RE or PRB occupied by the first reference signal.

Optionally, an SIB and the first reference signal are not transmitted on a same RE or a same PRB.

Implementation 3

In the implementation 3, a time domain pattern of a first reference signal consists of a time domain pattern of a second reference signal and a frequency domain pattern of the first reference signal consists of a frequency domain pattern of the second reference signal; or a time domain pattern consists of a pattern having a same time domain pattern as the first reference signal and a frequency domain pattern consists of a pattern having a same frequency domain pattern as the first reference signal; or a time domain pattern consists of a time domain pattern of a predefined time domain pattern and a frequency domain pattern consists of a frequency domain pattern of a predefined frequency domain pattern.

Optionally, the second reference signal includes at least one of: a CSI-RS, a PSS, an SSS or a random access preamble.

Optionally, the predefined pattern is a pattern occupying Y consecutive sub-carriers in frequency domain and Z consecutive OFDM symbols in time domain, where Y and Z are each a positive integer, and a value combination (Y, Z) of Y and Z includes at least one of (1, 2), (2, 1) or (2, 2).

In the embodiment, a time-frequency resource of the first reference signal may be divided into S sets, a sequence of the first reference signal is also divided into S sets, and each sequence set is mapped to a respective one time-frequency resource set.

Optionally, the first reference signal involved in the implementations 1 to 3 has at least one of the characteristics in the time domain described below.

A value of a transmission time periodicity T of the first reference signal is selected from a set T_set, where T and elements in the T_set are each a positive integer.

A value of a transmission time offset of the first reference signal is selected from a set t_set, where t and elements in the t_set are each a positive integer.

A time domain position of the first reference signal is associated with a transmission periodicity T and a time offset.

The number of symbols occupied by the first reference signal in one transmission periodicity is S, where $1 \le S \le 5$, and S is a positive integer.

Optionally, the time offsets of different base stations or different base station sets are different, and different time offsets may carry all or part of identities (IDs) of the base stations or the base station sets.

Figure 11A:
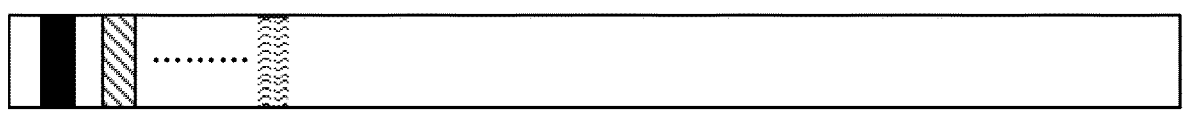
FIGS. 11*a* to 11*b* are each a schematic diagram of a pattern of a transmission periodicity according to an embodiment of the present application.
Figure 11B:
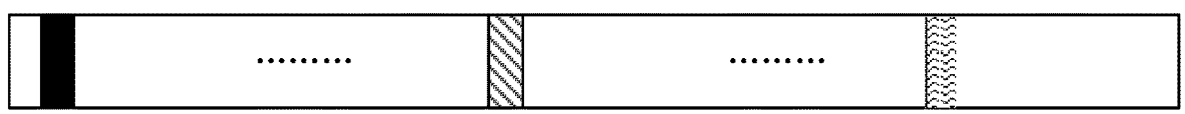

FIGS. 11*a* to 11*b* are each a schematic diagram of a pattern of a transmission periodicity according to an embodiment of the present application. As shown in FIGS. 11*a* to 11*b*, a periodicity pattern one is included in FIG. 11*a*, and a periodicity pattern two is included in FIG. 11*b*.

In the periodicity pattern one, the time offsets of the first reference signals sent by different base stations or different base station sets are distributed in a range $\alpha T$, where $0<\alpha<1$, and a value of a may be ½ or ¼; or reference signals sent by different base stations are mainly concentrated in time t, where $t<T$, and t is independent of T.

In the periodicity pattern two, the time offsets of the first reference signals sent by different base stations or different base station sets are distributed in a range $\beta T$, where $1/2 \le \beta < 1$, and a value of $\beta$ may be ¾.

Specifically, in the periodicity pattern one, a receiving end merely needs to receive the first reference signal within a period of time, which can reduce the complexity; in the periodicity pattern two, the time offset is more scattered in the periodicity T, and in this case, the first reference signal may carry more ID information.

Optionally, the first reference signal involved in the implementations 1 to 3 has at least one of the characteristics in the frequency domain described below.

A first base station or a first base station set simultaneously sends the first reference signal in n bandwidth parts (BWPs), where n is a positive integer.

Optionally, n bandwidth parts include at least one of a default BWP, an initial BWP or a bandwidth part including an interference frequency domain range.

A value of a frequency domain bandwidth F of the first reference signal is selected from a set F_set, where F and elements in the F_set are each a positive integer.

Optionally, the frequency domain bandwidths in F_set are in a range from 4 MHz to 20 MHz.

Optionally, F_set includes at least one of {4, 5, 10, 15, 20} MHz.

The sub-carrier spacing of the first reference signal is f KHz; or the sub-carrier spacing of the first reference signal is f1 KHz in a frequency range 1, and the sub-carrier spacing of the first reference signal is f2 KHz in a frequency range 2.

A value range of each of f, f1 and f2 is $\{15*2\mu\}$, and $\mu=0$, 1, 2, 3, 4. Optionally, f and f1 may be 15 or 30, and f2 may be 30.

The first reference signal is merely sent in the frequency range 1.

The first reference signal has the following characteristic: if a transmission frequency domain bandwidth of a first reference signal RS-1 is not less than a transmission frequency domain bandwidth of a first reference signal RS-2, a generation sequence of the first reference signal RS-2 is a subset of a generation sequence of the first reference signal RS-1.

It is to be noted that frequencies in the frequency range 1 do not exceed 6 GHz, and frequencies in the frequency range 2 are above 6 GHz.

Optionally, in the implementations 1 to 3, a center RE position of the first reference signal is different from a first predetermined position by F_offset RE positions, where the first predetermined position includes at least a center position of a synchronization raster, signal raster, PSS or SSS; and F_offset is a non-negative integer.

Optionally, after receiving the first reference signal, a second base station sends a second first reference signal. The second first reference signal and the first reference signal may be distinguished in the following manners: a sequence generation manner, a signal time-frequency domain mapping manner, information carried by a signal, a code-division manner, and the like.

From the description of the preceding implementations, the methods in the preceding embodiments may be implemented by means of software plus a general-purpose hardware platform or may of course be implemented by hardware. The solutions provided by the present application substantially, or the part contributing to the related art, may be embodied in the form of a software product. The computer software product is stored in a storage medium (such as a read-only memory (ROM)/random access memory (RAM), a magnetic disk or an optical disk) and includes multiple instructions for enabling a terminal device (which may be a mobile phone, a computer, a server, a network device or the like) to execute the methods according to embodiments of the present application.

Embodiment Two

This embodiment further provides an apparatus for processing interference. The apparatus is used for implementing the above-mentioned embodiments and optional implementations, and what has been described will not be repeated. As used below, the term "module" may be software, hardware or a combination of software and hardware capable of implementing predetermined functions. The apparatus in the embodiment described below may be implemented by software, but implementation by hardware or by a combination of software and hardware is also possible and conceived.

Figure 12:
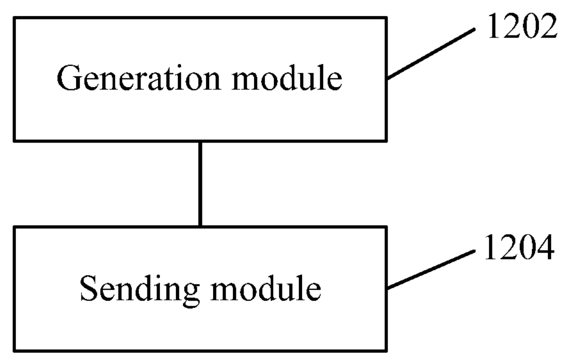
FIG. 12 is a structural diagram of an apparatus for processing interference according to an embodiment of the present application.

FIG. 12 is a structural diagram of an apparatus for processing interference according to an embodiment of the present application, and the apparatus is applied to a first base station side. As shown in FIG. 12, the apparatus includes a generation module 1202 and a sending module 1204. The generation module 1202 is configured to generate a first reference signal, and the sending module 1204 is coupled to the generation module 1202 and is configured to send the first reference signal according to a first parameter set.

It is to be noted that the first reference signal has at least one or any combination of the following characteristics: consisting of a cyclic prefix and N consecutive sequences; occupying P sub-carriers at an equal spacing within one physical resource block; being sent in an interleaved frequency division multiplexing mode; a sub-carrier spacing being 2μ times a downlink data channel; a time domain pattern and/or a frequency domain pattern consisting of a time domain pattern of a second reference signal and/or a frequency domain pattern of a second reference signal; or a time domain pattern and/or a frequency domain pattern consisting of a pattern having a same time domain pattern as a second reference signal and/or a pattern having a same frequency domain pattern as a second reference signal, where N and P are each a positive integer, $-4\leq\mu\leq4$, and μ is an integer. The second reference signal includes at least one of: a CSI-RS, a PSS, an SSS or a random access preamble. The first reference signal is generated by at least one of the following sequences: a PN sequence or a ZC sequence. In addition, an initialization value of a generation sequence of the first reference signal is associated with a first base station or a set to which the first base station belongs.

It is to be noted that each module described above may be implemented by software or hardware. Implementation by hardware may, but may not necessarily, be performed in the following manners: the modules described above are all located in the same processor, or the modules described above are respectively located in different processors in any combination form.

An embodiment of the present application further provides a storage medium. The storage medium stores a computer program. The computer program is configured to, when executed, performs the method of any one of the above-mentioned embodiments.

Optionally, in the embodiment, the preceding storage medium may be configured to store a computer program for performing the steps described below.

S1: A first reference signal is generated.

S2: The first reference signal is sent according to a first parameter set. The first reference signal has at least one or any combination of the following characteristics: consisting of a cyclic prefix and N consecutive sequences; occupying P sub-carriers at an equal spacing within one physical resource block; being sent in an interleaved frequency division multiplexing mode; a sub-carrier spacing being 2μ times a downlink data channel; a time domain pattern and/or a frequency domain pattern consisting of a time domain pattern of a second reference signal and/or a frequency domain pattern of a second reference signal; or a time domain pattern and/or a frequency domain pattern consisting of a pattern having a same time domain pattern as a second reference signal and/or a pattern having a same frequency domain pattern as a second reference signal, where N and P are each a positive integer, $-4\leq\mu\leq4$, and μ is an integer. The second reference signal includes at least one of: a CSI-RS, a PSS, an SSS or a random access preamble.

Optionally, in the embodiment, the storage medium may include a universal serial bus (USB) flash disk, a ROM, a RAM, a mobile hard disk, a magnetic disk, an optical disk or another medium capable of storing computer programs.

An embodiment of the present application further provides an electronic device. The electronic device includes a memory and a processor. The memory stores a computer program, and the processor is configured to execute the computer program to perform the steps in any one of the preceding method embodiments.

Optionally, the electronic device may further include a transmission device and an input/output device. Both the transmission device and the input/output device are connected to the processor.

Optionally, in the embodiment, the processor may be configured to perform the steps described below through a computer program.

S1: A first reference signal is generated.

S2: The first reference signal is sent according to a first parameter set.

Optionally, for specific examples in this embodiment, reference may be made to the examples described in the embodiments and optional implementations described above, which are not repeated in this embodiment.

Apparently, those skilled in the art should understand that multiple modules or multiple steps of the present application described above may be implemented by a general-purpose computing apparatus, the modules or steps may be concentrated on a single computing apparatus or distributed on a network composed of multiple computing apparatuses. Optionally, the modules or steps may be implemented by program codes executable by the computing apparatus, so that the modules or steps may be stored in a storage apparatus for execution by the computing apparatus, and in some circumstances, the illustrated or described steps may be performed in sequences different from those described herein, or the modules or steps may be made into one or multiple integrated circuit modules separately, or multiple modules or steps therein may be made into a single integrated circuit module for implementation. Therefore, the present application is not limited to a particular combination of hardware and software.

What is claimed is:

1. A communication method, comprising:

generating a first reference signal;

sending the first reference signal according to a first parameter set, the first parameter set comprising a reference signal periodicity, a number of repetition times in a periodicity, and a time offset set; and using a remote interference management identity for identifying a base station set sending the first reference signal, the remote interference management identity being associated with a frequency domain characteristic, a time domain characteristic, and a generation sequence of the first reference signal, wherein:

the first reference signal is sent by an interfering base station or an interfered base station, and the first reference signal in response to being sent by the interfering base station and the first reference signal in response to being sent by the interfered base station have different time-frequency resource allocations.

2. The method of claim 1, wherein the frequency domain characteristic comprises a frequency domain position offset of the first reference signal.

3. The method of claim 1, wherein the frequency domain characteristic comprises a starting position of at least one frequency domain resource occupied by the first reference signal.

4. A non-transitory storage medium, storing a computer program, wherein the computer program is configured to, when executed, cause an electronic device to:

generate a first reference signal;

send the first reference signal according to a first parameter set, the first parameter set comprising a reference signal periodicity, a number of repetition times in a periodicity, and a time offset set; and use a remote interference management identity for identifying a base station set sending the first reference signal, the remote interference management identity being associated with a frequency domain characteristic, a time domain characteristic, and a generation sequence of the first reference signal, wherein:

the first reference signal is sent by the electronic device when the electronic device is an interfering base station or an interfered base station, and the first reference signal in response to being sent by the interfering base station and the first reference signal in response to being sent by the interfered base station have different time-frequency resource allocations.

5. The non-transitory storage medium of claim 4, wherein the frequency domain characteristic comprises a frequency domain position offset of the first reference signal.

6. The non-transitory storage medium of claim 4, wherein the frequency domain characteristic comprises a starting position of at least one frequency domain resource occupied by the first reference signal.

7. An electronic device, comprising a memory and a processor, wherein the memory is configured to store a computer program, and the processor is configured to execute the computer program to cause the electronic device to:

generate a first reference signal;

send the first reference signal according to a first parameter set, first parameter set comprising a reference signal periodicity, a number of repetition times in a periodicity, and a time offset set; and use a remote interference management identity for identifying a base station set sending the first reference signal, the remote interference management identity being associated with a frequency domain characteristic, a time domain characteristic, and a generation sequence of the first reference signal, wherein:

the first reference signal is sent by the electronic device when the electronic device is an interfering base station or an interfered base station, and the first reference signal in response to being sent by the interfering base station and the first reference signal in response to being sent by the interfered base station have different time-frequency resource allocations.

8. The electronic device of claim 7, wherein the frequency domain characteristic comprises a frequency domain position offset of the first reference signal.

9. The electronic device of claim 7, wherein the frequency domain characteristic comprises a starting position of at least one frequency domain resource occupied by the first reference signal.

* * * * *